(12) United States Patent
Zhong et al.

(10) Patent No.: US 12,306,493 B2
(45) Date of Patent: May 20, 2025

(54) DISPLAY PANEL AND DISPLAY DEVICE

(71) Applicants: BEIJING BOE OPTOELECTRONICS TECHNOLOGY CO., LTD., Beijing (CN); BOE Technology Group Co., Ltd., Beijing (CN)

(72) Inventors: Xuan Zhong, Beijing (CN); Hongsheng Bi, Beijing (CN); Yao Bi, Beijing (CN); Jian Wang, Beijing (CN); Ce Wang, Beijing (CN); Bangjun Song, Beijing (CN); Ning Li, Beijing (CN); Haoran Zhang, Beijing (CN); Yichi Zhang, Beijing (CN); Xiaojuan Wu, Beijing (CN); Cuiyu Chen, Beijing (CN); Jinshuai Duan, Beijing (CN); Jiaxing Wang, Beijing (CN); Yu Zhao, Beijing (CN); Dawei Feng, Beijing (CN); Zhiqiang Yu, Beijing (CN); Feng Liu, Beijing (CN); Danxing Hou, Beijing (CN); Ning Wang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/282,335

(22) PCT Filed: Nov. 30, 2022

(86) PCT No.: PCT/CN2022/135599
§ 371 (c)(1),
(2) Date: Sep. 15, 2023

(87) PCT Pub. No.: WO2024/113252
PCT Pub. Date: Jun. 6, 2024

(65) Prior Publication Data
US 2025/0035978 A1   Jan. 30, 2025

(51) Int. Cl.
*G02F 1/1335*   (2006.01)
*G02F 1/1343*   (2006.01)
(Continued)

(52) U.S. Cl.
CPC .. *G02F 1/133553* (2013.01); *G02F 1/133528* (2013.01); *G02F 1/134309* (2013.01);
(Continued)

(58) Field of Classification Search
CPC ......... G02F 1/133553; G02F 1/133528; G02F 1/134309; G02F 1/1347; G02F 1/137; G02F 2203/02
See application file for complete search history.

(56) References Cited

U.S. PATENT DOCUMENTS

| | | |
|---|---|---|
| 4,832,461 A | 5/1989 | Yamagishi et al. |
| 5,724,112 A | 3/1998 | Yoshida et al. |

(Continued)

FOREIGN PATENT DOCUMENTS

| | | |
|---|---|---|
| CN | 104570454 A | 4/2015 |
| CN | 109844585 A | 6/2019 |

(Continued)

OTHER PUBLICATIONS

Office Action dated Dec. 24, 2024, issued in counterpart CN Application No. 202280004762.1, with English translation. (18 pages).

*Primary Examiner* — Donald L Raleigh
(74) *Attorney, Agent, or Firm* — WHDA, LLP

(57) ABSTRACT

A display substrate and a display device relate to the technical field of displaying. The display substrate includes a plurality of display units spaced apart from each other and (Continued)

a plurality of connection units, the plurality of connection units being connected between two adjacent display units; the plurality of connection units include: two connection units arranged along a first direction, wherein the first direction is parallel to a stretching direction of the display substrate; wherein the two connection units arranged along the first direction are axisymmetric with respect to a first reference line, so that the plurality of connection units arranged along a second direction have a same deformation amount in a stretching state, the second direction is perpendicular to the stretching direction, and an extension direction of the first reference line is parallel to the second direction.

19 Claims, 19 Drawing Sheets

(51) Int. Cl.
*G02F 1/1347* (2006.01)
*G02F 1/137* (2006.01)

(52) U.S. Cl.
CPC ............ *G02F 1/1347* (2013.01); *G02F 1/137* (2013.01); *G02F 2203/02* (2013.01)

(56) References Cited

U.S. PATENT DOCUMENTS

| | | | |
|---|---|---|---|
| 10,712,616 B1 | 7/2020 | Lee et al. | |
| 2002/0171789 A1 | 11/2002 | Ueda et al. | |
| 2003/0095228 A1* | 5/2003 | Hiji | G02F 1/13718 349/177 |
| 2015/0109562 A1 | 4/2015 | Tamaki et al. | |
| 2020/0225393 A1 | 7/2020 | Lim et al. | |

FOREIGN PATENT DOCUMENTS

| | | |
|---|---|---|
| CN | 113985643 A | 1/2022 |
| JP | 2005-206647 A | 8/2005 |
| JP | 2006-145952 A | 6/2006 |
| TW | 200841091 A | 10/2008 |

* cited by examiner

Table 3 case 1 The change of the display color of the PLCD with twist angle (Rubbing direction) of LC2 (the simulation results when LC1 is applied a high voltage of 6V, LC2 is applied with a voltage changing from 0V to 10V)

| Simulation condition | The twist angle of LC1 is 90° (unchanged), the Rubbing direction of the upper substrate is 45°, the Rubbing direction of the lower substrate is −45°, Re. of LC1 is 270 nm, LC1 is applied a voltage of 6V, Re. of LC2 is 140 nm, the change of the display color of the PLCD under different twist angle of LC2 is simulated. | | | | | | | |
|---|---|---|---|---|---|---|---|---|
| LC2 | twist angle(°) | 0 | 20 | 26 | 30 | 40 | 60 | 80 |
|  | Rubbing direction(°) | 0/0 | 10/−10 | 13/−13 | 15/−15 | 20/−20 | 30/−30 | 40/−40 |
|  | The voltage of LC2 changes from 0V to 10V |  |  |  |  |  |  |  |
| conclusion | The color changes from blue to red, twist angle of LC2 is 0° ~ −26°, the Rubbing direction of the upper substrate is 0° ~ −13°, the Rubbing direction of the lower substrate is 0° ~ −13°. | | | | | | | |

FIG. 10

Table 4 case 1 The change of the display color of the PLCD with Re. of LC2 (the simulation results when LC1 is applied a high voltage of 6V, LC2 is applied with a voltage changing from 0V to 10V)

| Simulation condition | The twist angle of LC1 is 90° (unchanged), the Rubbing direction of the upper substrate is 45°, the Rubbing direction of the lower substrate is -45°, Re. of LC1 is 270 nm, LC1 is applied a voltage of 6V, twist angle of LC2 is 0°, the Rubbing direction of the upper substrate is 45°, the Rubbing direction of the lower substrate is -45°, the change of the display color of the PLCD under different Re. of LC2 is simulated. | | | | | | | | |
|---|---|---|---|---|---|---|---|---|---|
| LC2 | Re. (nm) | 80 | 100 | 120 | 130 | 140 | 150 | 154 | 160 |
| | voltage of LC2: changes from 0V to 10V | 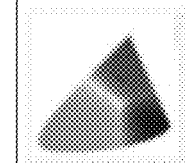 | 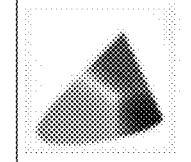 | 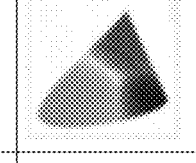 | 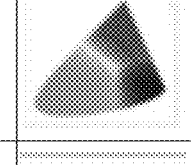 | 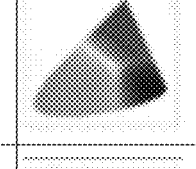 | 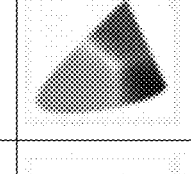 | 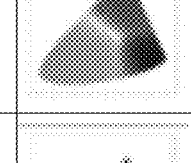 | 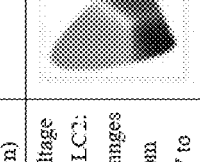 |
| conclusion | The color changes from blue to red, Re of LC2:130 nm~154 nm | | | | | | | | |

FIG. 11

Table 5 case 1 The change of the display color of the PLCD with the voltage of LC1 (the simulation results when LC1 is applied a voltage changing from 0V to 6V, LC2 is applied with a voltage changing from 0V to 10V)

| Simulation condition | The twist angle of LC1 is 90° (unchanged), the Rubbing direction of the upper substrate is 45°, the Rubbing direction of the lower substrate is -45°, Re. of LC1 is 270 nm, twist angle of LC2 is 0° (unchanged), the Rubbing direction of the upper substrate is 0°, the Rubbing direction of the lower substrate is 0°, Re. of LC2 is 140 nm, the change of the display color of the PLCD under different voltage of LC2 | | | | | | |
|---|---|---|---|---|---|---|---|
| LC | Voltage of LC1: Changes from 0V to 6V | 0 | 1 | 2 | 3 | 4 | 5 | 6 |
| | voltage of LC2 changes from 0V to 10V | 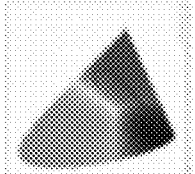 | 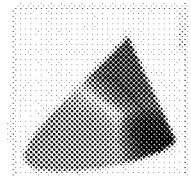 | 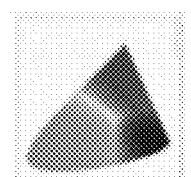 | 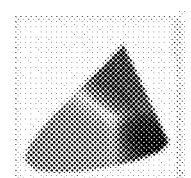 | 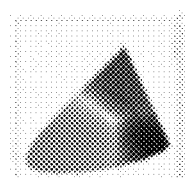 | 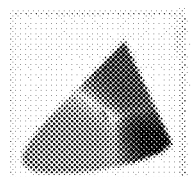 | 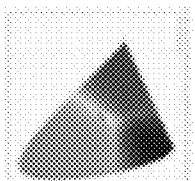 |
| conclusion | When voltage of LC2 is set to be less than 2V, unpowered on or applied with a low voltage, the voltage of LC2 changes from 0V to 10V, the display color of the RLCD changes from yellow to green; when voltage of LC2 is set to be larger than or equal to 2V (high voltage), the voltage of LC2 changes from 0V to 10V, the display color of the RLCD changes from blue to red | | | | | | |

FIG. 12

Table 9 case 2 The change of the display color of the PLCD with twist angle (Rubbing direction) of LC1 (the simulation results when LC2 is applied a high voltage of 6V, LC is applied with a voltage changing from 0V to 10V)

| Simulation condition | The twist angle of LC2 is 90° (unchanged), the Rubbing direction of the upper substrate is 45°, the Rubbing direction of the lower substrate is -45°, Re. of LC2 is 140 nm, LC2 is applied a voltage of 6V, Re. of LC1 is 270 nm, the change of the display color of the PLCD under different twist angle of LC1 is simulated. | | | | | | | |
|---|---|---|---|---|---|---|---|---|
| LC1 | twist angle(°) | 0 | 20 | 26 | 30 | 34 | 40 | 60 | 80 |
| | Rubbing direction(°) | 0/-0 | 10/-10 | 13/-13 | 15/-15 | 17/-17 | 20/-20 | 30/-30 | 40/-40 |
| | The voltage of LC1 changes from 0V to 10V | | | | | | | | |
| conclusion | The color changes from green to blue, twist angle of LC2 is 0°~34°, the Rubbing direction of the upper substrate is 0°~17°, the Rubbing direction of the lower substrate is 0°~-17° | | | | | | | | |

FIG. 19

Table 10 case 2 The change of the display color of the PLCD with Re. of LC2 (the simulation results when LC2 is applied a high voltage of 6V, LC1 is applied with a voltage changing from 0V to 10V)

| Simulation condition | The twist angle of LC2 is 90° (unchanged), the Rubbing direction of the upper substrate is 45°, the Rubbing direction of the lower substrate is -45°, Re. of LC2 is 140 nm, LC2 is applied a voltage of 6V, twist angle of LC1 is 0°, the Rubbing direction of the upper substrate is 0°, the Rubbing direction of the lower substrate is 0° | | | | | | | |
|---|---|---|---|---|---|---|---|---|
| LC1 | Re. (nm) | 230 | 240 | 250 | 260 | 270 | 275 | 280 | 290 |
| | voltage of LC1: changes from 0V to 10V | 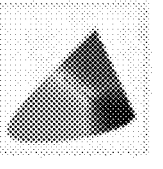 | 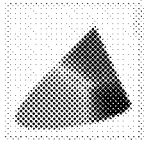 | 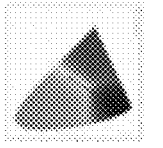 | 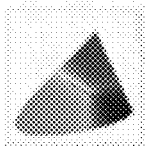 | 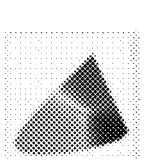 | 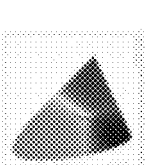 | 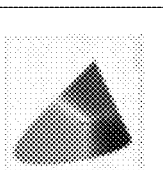 | 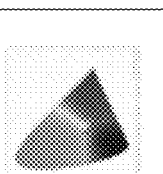 |
| conclusion | The color changes from green to blue, Re. of LC1:240 nm~275 nm | | | | | | | |

FIG. 20

Table 11 case 2 The change of the display color of the PLCD with the voltage of LC1 (the simulation results when LC1 is applied with a voltage changing from 0v to 10V, LC2 is applied with a voltage changing from 0V to 10V)

| Simulation condition | The twist angle of LC1 is 20° (unchanged), the Rubbing direction of the upper substrate is 10°, the Rubbing direction of the lower substrate is -10°, Re. of LC1 is 270 nm, twist angle of LC2 is 90° (unchanged), the Rubbing direction of the upper substrate is 45°, the Rubbing direction of the lower substrate is 45°, the change of the display color of the PLCD under different voltage of LC1 is simulated. | | | | | | | | | | |
|---|---|---|---|---|---|---|---|---|---|---|---|
| LC2 | Voltage of LC2: Changes from 0V to 10V | 0 | 1 | 2 | 3 | 4 | 5 | 6 | 7 | 8 | 9 | 10 |
| LC1 | voltage of LC1: changes from 0V to 10V | | | | | | | | | | | |
| conclusion | When voltage of LC2 is set to be less than or equal to 2V (unpowered on or applied with a low voltage), the voltage of LC1 changes from 0V to 10V, the display color of the RLCD changes from red to blue; When voltage of LC2 is set to be larger than 2V and less than or equal to 5V (middle voltage), the voltage of LC2 changes from 0V to 10V, the display color of the RLCD changes from yellow to blue; When voltage of LC2 is set to be larger than 5V (high voltage) and less than or equal to 5V (high voltage), the voltage of LC2 changes from 0V to 10V, the display color of the RLCD changes from green to blue. | | | | | | | | | | | |

FIG. 21

POL

LC rubbing direction

DISPLAY PANEL AND DISPLAY DEVICE

TECHNICAL FIELD

The present disclosure relates to the technical field of display and, more particularly, to a display panel and a display device.

BACKGROUND

A reflective display device has great development potential in the fields of smart wear, electronic books, electronic price tags and the like because of the advantages of eye protection and low power consumption. At present, when the reflective display device performs color display, often exists some defects, for example few colors are capable of being implemented, long response time, high requirements for ambient temperature and high cost and so on, causing poor user experience.

SUMMARY

The embodiment of the present application adopts the following technical solutions:

In one aspect, an embodiment of the present application provides a display panel, including:
- a first polarization unit;
- a reflection unit disposed opposite to the first polarization unit; and
- at least one liquid crystal cell disposed between the first polarization unit and the reflection unit; the liquid crystal cell includes a liquid crystal layer, and a liquid crystal in the liquid crystal layer has birefringence and optical rotation, and a range of a total equivalent retardation amount of the liquid crystals in all the liquid crystal cells includes 100-441 nm.

Optionally, a twist angle range of the liquid crystal in the liquid crystal layer of each of the liquid crystal cells includes 0°-90°.

Optionally, the liquid crystal in the liquid crystal layer of each of the liquid crystal cells is cholesteric liquid crystal; and
each of the liquid crystal cells further includes two electrodes disposed opposite to each other, and the cholesteric liquid crystal is located between the two electrodes disposed opposite to each other.

Optionally, the display panel at least includes a first liquid crystal cell and a second liquid crystal cell, wherein the first liquid crystal cell is disposed between the first polarization unit and the second liquid crystal cell, and the second liquid crystal cell is disposed between the first liquid crystal cell and the reflection unit;
the first liquid crystal cell includes a first liquid crystal layer, and the second liquid crystal cell includes a second liquid crystal layer, and an equivalent retardation amount of a first liquid crystal in the first liquid crystal layer is larger than that of a second liquid crystal in the second liquid crystal layer.

Optionally, the display panel includes the first liquid crystal cell and the second liquid crystal cell, and a range of the equivalent retardation amount of the first liquid crystal in the first liquid crystal layer includes 200 nm~400 nm; and
a range of the equivalent retardation amount of the second liquid crystal in the second liquid crystal layer includes 100 nm~200 nm.

Optionally, an equivalent optical axis direction of the first liquid crystal in the first liquid crystal layer is the same as an equivalent optical axis direction of the second liquid crystal in the second liquid crystal layer, and a range of the included angle of both the equivalent optical axis direction with a transmission axis of the first polarization unit includes 42°~–48°.

Optionally, the first liquid crystal in the first liquid crystal layer has a first twist angle, and the second liquid crystal in the second liquid crystal layer has a second twist angle, a range of one of the first twist angle and the second twist angle includes 0°~34°, and a range of the other one of the first twist angle and the second twist angle includes 89°~90°.

Optionally, the thickness of the first liquid crystal cell along the direction perpendicular to the first polarization unit is larger than the thickness of the second liquid crystal cell along the direction perpendicular to the first polarization unit.

Optionally, the first liquid crystal cell further includes a first substrate and a second substrate, wherein the first substrate is disposed opposite to the second substrate, the first substrate includes a first electrode, and the second substrate includes a second electrode, and the first liquid crystal layer is arranged between the first electrode and the second electrode; the second liquid crystal cell further includes a third substrate and a fourth substrate, wherein the third substrate is disposed opposite to the fourth substrate, the third substrate includes a third electrode, and the fourth substrate includes a fourth electrode, and the second liquid crystal layer is disposed between the third electrode and the fourth electrode; and
the first electrode and the second electrode are configured to have a first voltage difference, and the third electrode and the fourth electrode are configured to have a second voltage difference, when any one of the first voltage difference and the second voltage difference is not zero, a total equivalent retardation amount of the first liquid crystal in the first liquid crystal layer and the second liquid crystal in the second liquid crystal layer is less than that of the first liquid crystal in the first liquid crystal layer and the second liquid crystal in the second liquid crystal layer when both the first voltage difference and the second voltage difference are zero.

Optionally, under the condition that the first voltage difference is configured to be at a first fixed value, and the second voltage difference is configured to change within a first preset range, the range of the equivalent retardation amount of the first liquid crystal in the first liquid crystal layer includes 200 nm~400 nm; and the range of the equivalent retardation amount of the second liquid crystal in the second liquid crystal layer includes 130 nm~154 nm.

Optionally, a range of the first fixed value includes 0V-6V; and the first preset range includes 0V-10V.

Optionally, under the condition that the second voltage difference is configured to be at a second fixed value, and the first voltage difference is configured to change within a second preset rang, the range of the equivalent retardation amount of the first liquid crystal in the first liquid crystal layer includes 240 nm~275 nm; the range of the equivalent retardation amount of the second liquid crystal in the second liquid crystal layer includes 100 nm~200 nm.

Optionally, a range of the second fixed value range includes 0V~10V; and the second preset range includes 0V~10V.

Optionally, the display panel includes a third liquid crystal cell disposed between the first polarization unit and the reflection unit; and
the display panel further includes a second polarization unit, wherein the second polarization unit is disposed at a side of the reflection unit close to the third liquid crystal cell, or the second polarization unit is disposed at a side of the reflection unit far away from the third liquid crystal cell;

the third liquid crystal cell includes a third liquid crystal layer, and a range of an equivalent retardation amount of a third liquid crystal in the third liquid crystal layer includes 321 nm~441 nm.

Optionally, the third liquid crystal cell further includes a fifth substrate and a sixth substrate, the fifth substrate and the sixth substrate are disposed oppositely to each other, the fifth substrate includes a fifth electrode, and the sixth substrate includes a sixth electrode, and the third liquid crystal layer is arranged between the fifth electrode and the sixth electrode; and the fifth electrode and the sixth electrode are configured to have a third voltage difference, and a range of the third voltage difference includes 0V~6V.

Optionally, a transmission axis of the second polarization unit is not parallel to the transmission axis of the first polarization unit.

Optionally, the transmission axis of the second polarization unit is perpendicular to the transmission axis of the first polarization unit.

Optionally, the display panel further includes an absorption unit configured to absorb light parallel to the transmission axis of the second polarization unit; and under the condition that the second polarization unit is disposed at a side of the reflection unit close to the third liquid crystal cell, the absorption unit is disposed at a side of the reflection unit far away from the second polarization unit; under the condition that the second polarization unit is disposed at a side of the reflection unit far away from the third liquid crystal cell, the absorption unit is disposed at a side of the second polarization unit far away from the reflection unit.

Optionally, the absorption unit includes black ink or a third polarization unit, and a transmission axis of the third polarization unit is perpendicular to the transmission axis of the second polarization unit.

In the other aspect, an embodiment of the present application provides a display device, including the display panel above-mentioned.

The above description is merely a summary of the technical solutions of the present disclosure. In order to more clearly understand the technical means of the present disclosure to enable the implementation according to the content of the description, and to make the above-mentioned and other purposes, features and advantages of the present disclosure more apparent and understandable, the particular embodiments of the present disclosure are provided below.

BRIEF DESCRIPTION OF THE DRAWINGS

In order to more clearly illustrate the technical solutions of the embodiments of the present disclosure or the related technologies, the figures that are required to describe the embodiments or the related technologies will be briefly introduced below. Apparently, the figures that are described below are some embodiments of the present disclosure, and a person skilled in the art may obtain other figures according to these figures without paying creative work. It should be noted that, the proportion in the drawings is merely indicative and does not represent actual proportion.

FIG. 10 is a schematic diagram of a result that LC1 is applied with a voltage of 6V and LC2 is applied with a voltage changing from 0V to 6V in the display panel shown in FIG. 1.

FIG. 11 is a schematic diagram of another result that LC1 is applied with a voltage of 6V and LC2 is applied with a voltage changing from 0V to 6V in the display panel shown in FIG. 1;

FIG. 12 is a schematic diagram of another result that LC1 is applied with a voltage changing from 0V to 6V and LC2 is applied a voltage changing from 0V to 6V in the display panel shown in FIG. 1.

FIG. 19 is a schematic diagram of a result that LC2 is applied with a voltage of 6V and LC1 is applied with a voltage changing from 0V to 6V in the display panel shown in FIG. 1.

FIG. 20 is a schematic diagram of another result that LC2 is applied with a voltage of 6V and LC1 is applied with a voltage changing from 0V to 6V in the display panel shown in FIG. 1.

FIG. 21 is a schematic diagram of a result that LC2 is applied with a voltage change from 0V to 10V and LC1 is applied with a voltage change from 0V to 10V in the display panel shown in FIG. 1.

DETAILED DESCRIPTION

Figure 1:
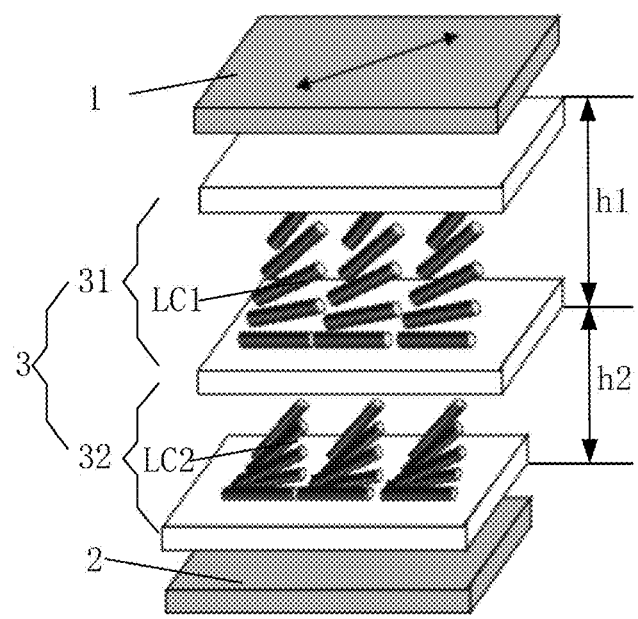
FIG. 1 is a structural schematic diagram of the display panel according to an embodiment of the present application.

In order to make the purposes, the technical solutions and the advantages of the embodiments of the present disclosure more clearly, the technical solutions of the embodiments of the present disclosure will be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work will fall within the protection scope of the present disclosure.

In the drawings, the thickness of areas and layers may be exaggerated for clarity. The same reference symbol in the drawings denotes the same or similar structures, and therefore their detailed description will be omitted. In addition, the drawings are merely schematic illustrations of the present application, and are not necessarily drawn to scale.

In the embodiments of the present application, unless otherwise specified, the meaning of "a plurality of 1" is two or more. The orientation or positional relationship indicated by the term "above" is based on the orientation or positional relationship shown in the drawings, which is merely for the convenience of describing the present application and simplifying the description, and does not indicate or imply that the referred structure or element must have a specific orientation, be constructed and operated in a specific orientation, so that it may not be understood as a limitation of the present application.

Unless the context requires otherwise, throughout the description and claims, the term "include" is interpreted as an open and inclusive meaning, that is, "include but not limited to". For describing of the description, the terms "one embodiment", "some embodiments", "exemplary embodiment", "example", "specific example" or "some examples" are intended to indicate that a specific feature, structure, material or characteristic related to this embodiment or example is included in at least one embodiment or example of the present application. The schematic representation of the above-mentioned terms does not necessarily refer to the same embodiment or example. Furthermore, the particular features, structures, materials or characteristics may be included in any one or more embodiments or examples in any suitable way.

In the embodiments of the present application, the words "first", "second", "third", "fourth", "fifth" and "sixth" and the like are used for distinguishing the same or similar items with basically the same function and effect, and merely to clearly describe the technical solutions of the embodiment of the present application, and should not be understood as indicating or implying relative importance or implicitly indicating the number of indicated technical features.

A reflective display device has great development potential in in the fields of smart wear, electronic books, electronic price tags, electronic billboards and the like, because of the advantages of eye protection and low power consumption. Reflective Liquid Crystal Display (LCD) is one of the reflective display devices. The Reflective LCD has many advantages, for example: a display may be realized by using external natural light, and the ability of liquid crystal to display clear images with extremely low power consumption is shown; the display brightness depends on ambient light, which is more easily accepted by human eyes, thus having the function of eye protection; backlight may not be used, so that the device is relatively thin, and is convenient to be carried and the like.

At present, reflective display devices on the market mainly include an Electronic Ink Screen (E-Ink) and a Reflective Liquid Crystal Display (RLCD), but are mainly focused on black and white displays currently. An E-Ink color display is mainly realized by color electronic ink, but the currently achievable color is less (generally merely two types: black, white and red, and black, white, red and yellow). Meanwhile, a display response time of the E-Ink is long (about ~100 ms), the writing handwriting is seriously smeared, and the ink has a high requirement on ambient environment temperature of use (0° C.~70° C.), so that the customer experience is seriously affected.

The response time of a color display of the RLCD is short, and the requirement for ambient temperature of use is low (−30° C.~80° C.). However, a special Polarizer (POL) is required to be used, for example, a POL with a scattering film is required, which causes an increase in cost. At the same time, the color display requires to additionally add a Color Filtration (CF), and the CF has a great loss of reflectivity, which causes an increase in cost and a loss of reflectivity and poor display effect.

Figure 2:
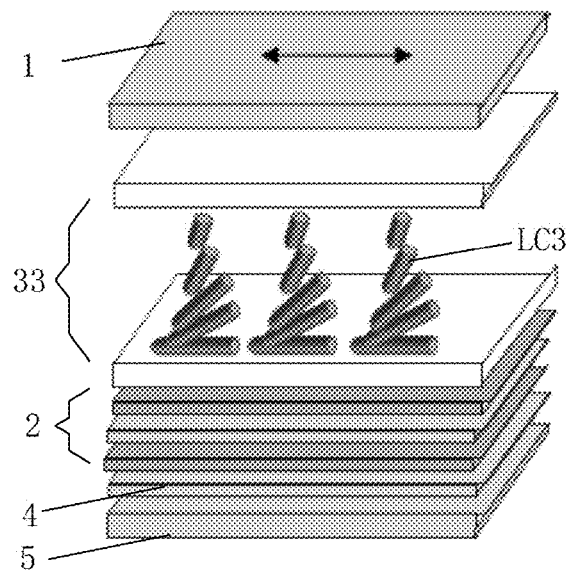
FIG. 2 is a structural schematic diagram of another display panel according to an embodiment of the present application.

Based on the above-mentioned, an embodiment of the present application provides a display panel, and as shown in FIGS. 1 and 2, the display panel includes:

a first polarization unit 1;

a reflection unit 2 disposed opposite to the first polarization unit 1; and at least one liquid crystal cell 3 disposed between the first polarization unit 1 and the reflection unit 2; the liquid crystal cell 3 includes a liquid crystal layer, and a liquid crystal in the liquid crystal layer has birefringence and optical rotation, and a range of a total equivalent retardation amount of the liquid crystals in all the liquid crystal cells includes 100 nm~441 nm.

The type of the display panel above-mentioned is not particularly limited herein, and for example, the display panel may include an LCD display panel. Further alternatively, the display panel may include a RLCD display panel.

The material and type of the first polarization unit above-mentioned are not particularly limited herein. For example, the materials of the first polarization unit may include polyvinyl alcohol (PVA), polyvinyl chloride (PVC), cellulose triacetate (TAC) and the like. The types of the first polarization unit may include a linear polarizer, an optical grating and the like. Further alternatively, the first polarization unit may include a TAC, a PVA, a TAC and a pressure sensitive adhesive (PSA) which are sequentially stacked. It should be noted that, the first polarization unit 1 may be abbreviated as POL1.

The material and type of the reflection unit above-mentioned are not particularly limited herein. For example, the reflection unit may include a film layer capable of reflecting visible light, for example, a metal reflection layer, an Advanced Polarizer Film (APF) film and the like.

The display panel above-mentioned includes at least one liquid crystal cell, which means that the display panel includes a liquid crystal cell, alternatively, the display panel includes a plurality of liquid crystal cells, depending on the actual application.

The structure of the liquid crystal cell above-mentioned is not particularly limited herein. For example, the liquid crystal cell above-mentioned may include an upper substrate and a lower substrate which are disposed opposite to each other, and a liquid crystal layer disposed between the upper substrate and the lower substrate.

The type of the liquid crystal above-mentioned in the liquid crystal layer is not particularly limited herein. For example, the liquid crystal in the liquid crystal layer above-mentioned may be a Twisted Nematic (TN) liquid crystal.

The range of the total equivalent retardation of the liquid crystals in all the above-mentioned liquid crystal cells is not particularly limited herein. For example, the total equivalent retardation of the liquid crystals in all the above-mentioned liquid crystal cells may be 100 nm, 200 nm, 300 nm, 400 nm or 441 nm and so on.

The birefringence above-mentioned means that after incident light (visible light) entering the liquid crystal cell, the liquid crystal in the liquid crystal cell has different refractive indexes ($\Delta n$) for light of various frequencies, and the propagation directions of the light of various colors are deflected to different degrees, so that the incident light is dispersed after leaving the liquid crystal cell, that is, dispersion occurs. The dispersion effect may make the emission amounts of visible light with different wavelengths are different after the incident light transmitting through the liquid crystal cell and the reflection unit, causing a color cast phenomenon occurring, that is, a color display may be performed. In this point, under the condition that the emission amounts of the visible light in a certain wavelength band are more, a corresponding color may be displayed. For example, under the condition that emission amounts of light near the wavelength of 550 nm are more and emission amounts of light in other wavelength bands are less, a color tends to green may be displayed; under the condition that emission amounts of light with wavelength less than 400 nm are less, and emission amounts of light with other wavelength bands are more, a color tends to yellow may be displayed. Taking a TN liquid crystal as an example, factors that affect the dispersion effect of a TN liquid crystal cell (liquid crystal cell) are more, including, for example, a liquid crystal Twist Angle (LC Twist Angle), a Rubbing direction (rubbing alignment), thickness of liquid crystal cell in the direction perpendicular to the first polarization unit (liquid crystal cell thickness), an operation voltage, an angle of transmission axis/absorption axis of the first polarization unit, and so on.

The optical rotation above-mentioned means that the polarization direction of the incident light may change with the optical axis direction of the liquid crystal in case that the liquid crystal is not powered on or is applied with a low voltage (a voltage that is capable of making the liquid crystal in a non-vertical state); and in case that the liquid crystal is applied with a high voltage (a voltage that is capable of making the liquid crystal in a vertical state), the liquid crystal molecules are erected, and the polarization direction of the incident light does not change.

An embodiment of the present application provides a display panel, the display panel includes: a first polarization unit; a reflection unit disposed opposite to the first polarization unit; and at least one liquid crystal cell disposed between the first polarization unit and the reflection unit; the liquid crystal cell includes a liquid crystal layer, and a liquid crystal in the liquid crystal layer has birefringence and optical rotation, and a range of a total equivalent retardation amount of the liquid crystals in all the liquid crystal cells includes 100 nm~441 nm.

Since the liquid crystals in all the liquid crystal cells above-mentioned may be equivalent to a ¼~½ wave plate, this ¼~½ wave plate may perform polarization state modulation on visible light (wavelength range is 380 nm~780 nm). When visible light is emitted to the display panel provided by the present embodiment of the present application, the light of about 380/4 nm~780/2 nm (that is, about 95 nm~390 nm) may be seen by human eyes, and combined with the birefringence, optical rotation and other properties of the liquid crystal, when the visible light is emitted to the display panel having the liquid crystal has the range of the total equivalent retardation amount including 100 nm~441 nm provided by the embodiment of the present application, the human eyes may see a clear color-displayed image. However, for example, when light with a wavelength of 360 nm is emitted to the display panel, it is very likely that the human eye may not see the display or may hardly see the color display. In this way, the present application provides a novel reflective display panel, which does not require a first polarization unit with a color film and a special structure, and a color display may be realized merely by a first polarization unit with a conventional structure and a liquid crystal cell. On the one hand, since no color film is required, this reflective display panel has high reflectivity and clear color display. On the other hand, since a first polarization unit with a special structure is not required, the structure and process of this reflective display panel are relatively simple and the cost is relatively low. On another hand, the response time of this reflective display panel is fast (estimated to be 40 ms), the refresh rate is high, and the problem of smear is reduced or even eliminated. On another hand, this reflective display panel has high environmental reliability, may work in a large temperature range (for example, −30° C.~80° C.), and has many application scenarios.

Optionally, referring to FIGS. 1 and 2, a twist angle range of the liquid crystal in the liquid crystal layer of each of the liquid crystal cells includes 0°~90°. Therefore, by controlling the twist angle of the liquid crystal in every liquid crystal layer, the equivalent $\Delta n$, equivalent Re. of the liquid crystal may be affected, so that the reflective display panel may realize better color display.

The twist angle of the liquid crystal in the liquid crystal layer of each of the liquid crystal cells above-mentioned is not particularly limited herein. For example, the twist angle of the liquid crystal in the liquid crystal layer of each of the liquid crystal cells may be 0°, 45°, 60°, 80° or 90°, and so on.

The preparation process of the twist angle of the liquid crystal in the liquid crystal layer of each liquid crystal cell above-mentioned is not particularly limited herein. For example, the twist angle of the liquid crystal may be realized by an initial Rubbing orientation is performed on an upper substrate and a lower substrate on both sides of the liquid crystal layer. Now, for example, the twist angle of the liquid crystal in the liquid crystal layer of each of the liquid crystal cells is 90°. Taking the twist angle of the liquid crystal in the liquid crystal layer of each of the liquid crystal cells is 90° as an example for describing, in this point, the Rubbing direction of the upper substrate on a side of the liquid crystal layer is making to be 45°, and the Rubbing direction of the lower substrate on the other side of the liquid crystal layer is making to be −45°, so that the twist angle of the liquid crystal is 90°.

Optionally, the liquid crystal in the liquid crystal layer of each of the liquid crystal cells is cholesteric liquid crystal; and each of the liquid crystal cells further includes two electrodes disposed opposite to each other, and the cholesteric liquid crystal is located between the two electrodes disposed opposite to each other.

The cholesteric liquid crystal above-mentioned has a helical structure, molecules of the cholesteric liquid crystal may be layered and arranged in a twisted manner, and the layers are distributed in parallel; the cholesteric liquid crystal in each of the layers lies flat in the layer when it is not powered on or is applied with a low voltage, and the cholesteric liquid crystal in each of the layers is vertical in the layer when it is applied a high voltage. The cholesteric liquid crystal is selective reflection, complying with Bragg reflection law: the reflection center wavelength L=n×P0, and the reflection wave width ΔL=Δn×P0, wherein P0 is a pitch of the liquid crystal. The pitch of cholesteric liquid crystal may be adjusted to make its reflection wavelength in the visible light range, so that the cholesteric liquid crystal may be colored when it is in plane texture. Therefore, the display panel provided by the embodiment of the present application is a TN display panel, that is, a twisted nematic liquid crystal display panel, and different states of the cholesteric liquid crystal may be controlled by voltages applied on the electrodes at both sides of the cholesteric liquid crystal to realize different color displays.

Optionally, referring to FIG. 1, the display panel at least includes a first liquid crystal cell 31 and a second liquid crystal cell 32, wherein the first liquid crystal cell 31 is disposed between the first polarization unit 1 and the second liquid crystal cell 32, and the second liquid crystal cell 32 is disposed between the first liquid crystal cell 31 and the reflection unit 2. The first liquid crystal cell 31 includes a first liquid crystal layer, and the second liquid crystal cell 32 includes a second liquid crystal layer, and an equivalent retardation amount of a first liquid crystal LC1 in the first liquid crystal layer is larger than that of a second liquid crystal LC2 in the second liquid crystal layer.

The display panel above-mentioned includes at least a first liquid crystal cell and a second liquid crystal cell, which means that the display panel above-mentioned includes a first liquid crystal cell and a second liquid crystal cell; alternatively, the display panel further includes other liquid crystal cells besides the first liquid crystal cell and the second liquid crystal cell, which is not particularly limited herein. For example, the display panel may include three liquid crystal cells, such as a first liquid crystal cell, a second liquid crystal cell and a fourth liquid crystal cell. Wherein, the fourth liquid crystal cell may be disposed between the first liquid crystal cell and the second liquid crystal cell; or, the fourth liquid crystal cell may be disposed on a side of the first liquid crystal cell far away from the second liquid crystal cell; or, the fourth liquid crystal cell may be disposed on a side of the second liquid crystal cell far away from the first liquid crystal cell. The fourth liquid crystal cell includes a fourth liquid crystal layer, and an equivalent retardation amount of the fourth liquid crystal in the fourth liquid crystal layer may be the same as that of the first liquid crystal in the first liquid crystal layer; or, the equivalent retardation amount of the fourth liquid crystal in the fourth liquid crystal layer may be the same as that of the second liquid crystal in the second liquid crystal layer; or, the equivalent retardation amount of the fourth liquid crystal in the fourth liquid crystal layer may be different from that of both the first liquid crystal in the first liquid crystal layer and the second liquid crystal in the second liquid crystal layer, and it is not particularly limited herein.

The structure of the first liquid crystal cell above-mentioned is not particularly limited herein. For example, the first liquid crystal cell may include a first substrate and a second substrate which are disposed opposite to each other, and a first liquid crystal layer disposed between the first substrate and the second substrate.

The structure of the second liquid crystal cell above-mentioned is not particularly limited herein. For example, the second liquid crystal cell may include a third substrate and a fourth substrate which are disposed opposite to each other, and a second liquid crystal layer disposed between the third substrate and the fourth substrate.

It should be noted that, the first liquid crystal cell and the second liquid crystal cell above-mentioned may share one substrate, that is, the second substrate and the third substrate may be one substrate.

In the display panel provided by the embodiment of the present application, the equivalent retardation amount of the first liquid crystal in the first liquid crystal layer is larger than that of the second liquid crystal in the second liquid crystal layer. Since the liquid crystal has an adjustment function for visible light with different wavelengths, this adjustment function is related to the equivalent retardation amount of the liquid crystal. Particularly, when the equivalent retardation amount of the liquid crystal is relatively low, for example, 100 nm, it is effective for low waveband visible light in this point, and the emission amount of the low waveband light is increased, so that the display panel may realize a color tends to blue. When the equivalent retardation amount of the liquid crystal is relatively high, for example, 400 nm, it is effective for high waveband visible light in this point, and the emission amount of the high waveband light is relatively more, so that the display panel may realize a color tending to red. When the equivalent retardation amount of the liquid crystal is in the middle, it is effective for visible light in the middle waveband, and the emission amount of the light in the middle waveband is increased, so that the display panel may realize to display a color changing from yellowish to green. That is, the display panel provided by the embodiment of the present application may affect the equivalent Δn, equivalent Re. of the liquid crystal by controlling the relationship of the equivalent retardation amount of the liquid crystal in the liquid crystal layer of at least two liquid crystal cells, so that the reflective display panel may realize better and more color displays.

Optionally, referring to FIG. 1, the display panel includes the first liquid crystal cell 31 and the second liquid crystal cell 32, and a range of the equivalent retardation amount of the first liquid crystal in the first liquid crystal layer includes 200 nm~400 nm, a range of the equivalent retardation amount of the second liquid crystal in the second liquid crystal layer includes 100 nm~200 nm. Consequently, the first liquid crystal in the first liquid crystal layer may be effective for visible light in the middle waveband and high waveband, the display panel may realize various colors, for example, a color tends to change from yellow to green, a color tends to red and the like, and the second liquid crystal in the second liquid crystal layer may be effective for visible light in the middle waveband and low waveband, so that the display panel may realize various colors, for example, a color tends to change from yellow to green, a color tends to blue and the like That is, the equivalent retardation amount of the liquid crystals in the liquid crystal layers of each of the liquid crystal cells may be controlled respectively, to affect the equivalent Δn, equivalent Re. and the like of the liquid crystals. Therefore, the reflective display panel may achieve better color display.

The equivalent retardation amount of the first liquid crystal in the first liquid crystal layer is not particularly limited herein. For example, the equivalent retardation amount of the first liquid crystal in the first liquid crystal layer may be 200 nm, 250 nm, 300 nm, 350 nm or 400 nm, and so on.

The equivalent retardation amount of the second liquid crystal in the second liquid crystal layer is not particularly limited herein. For example, the equivalent retardation amount of the second liquid crystal in the second liquid crystal layer may be 100 nm, 130 nm, 150 nm, 180 nm or 200 nm, and so on.

Optionally, referring to FIG. 1, an equivalent optical axis direction of the first liquid crystal LC1 in the first liquid crystal layer is the same as an equivalent optical axis direction of the second liquid crystal LC2 in the second liquid crystal layer, and a range of the included angle of both the equivalent optical axis direction with a transmission axis of the first polarization unit 1 includes 42°~48°. Consequently, by controlling the relationship between the equivalent optical axis directions of the liquid crystals in the liquid crystal layers of the two liquid crystal cells and the included angle relationship between the equivalent optical axis direction and the transmission axis of the first polarization unit, the equivalent $\Delta n$, equivalent Re. and the like of the liquid crystal may be affected. Therefore, the reflective display panel may achieve a better color display.

In case that the liquid crystal is under an unpowered on state, the equivalent optical axis of the liquid crystal is a middle direction of the Rubbing direction of the substrates (upper substrate and lower substrate) on both sides of the liquid crystal, that is, the included angle of the upper substrate and the orientation direction of the liquid crystal and that of the lower substrate and the orientation direction of the liquid crystal are the twist angle of the liquid crystal, and the axis of a half the twist angle of the liquid crystal is the equivalent optical axis of the liquid crystal. Even though in case that the liquid crystal is under a powered on state, the equivalent optical axis of the liquid crystal may not change. Particularly, the equivalent optical axis direction of the first liquid crystal in the first liquid crystal layer above-mentioned is a middle direction of the Rubbing direction of a first substrate and a second substrate in the first liquid crystal cell. The equivalent optical axis direction of the second liquid crystal in the second liquid crystal layer above-mentioned is a middle direction of the Rubbing direction of a third substrate and a fourth substrate in the second liquid crystal cell.

The included angle of the equivalent optical axis of the first liquid crystal in the first liquid crystal layer and the transmission axis of the first polarization unit above-mentioned is not particularly limited herein. For example, the included angle between the equivalent optical axis of the first liquid crystal in the first liquid crystal layer and the transmission axis of the first polarization unit above-mentioned may be 42°, 43°, 45°, 46°, 47° or 48°, and so on.

Optionally, referring to FIG. 1, the first liquid crystal LC1 in the first liquid crystal layer has a first twist angle, and the second liquid crystal LC2 in the second liquid crystal layer has a second twist angle, a range of one of the first twist angle and the second twist angle includes 0°~34°, and a range of the other one of the first twist angle and the second twist angle includes 89°~90°. Consequently, the twist angles of the liquid crystals in the liquid crystal layers of each of the liquid crystal cells may be controlled respectively, to affect the equivalent $\Delta n$ and equivalent Re. of the liquid crystal, so that the reflective display panel may realize a better color display.

One of the first twist angle and the second twist angle above-mentioned is not particularly limited herein. For example, one of the first twist angle and second twist angle may be 0°, 5°, 10°, 20°, 26°, 30° or 34°, and so on.

The other twist angle above-mentioned is not particularly limited herein. For example, the other twist angle may be 89° or 90°, and so on.

Optionally, referring to FIG. 1, the thickness h1 of the first liquid crystal cell 31 along the direction perpendicular to the first polarization unit 1 is larger than the thickness h2 of the second liquid crystal cell 32 along the direction perpendicular to the first polarization unit 1. Therefore, by controlling the thickness of each of the liquid crystal cells, that is, the cell thickness, the equivalent $\Delta n$, equivalent Re. and the like of the liquid crystal may be affected, so that the reflective display panel may realize a better color display.

Optionally, referring to FIG. 1, the first liquid crystal cell 31 further includes a first substrate and a second substrate, wherein the first substrate is disposed opposite to the second substrate, the first substrate includes a first electrode, and the second substrate includes a second electrode, and the first liquid crystal layer is disposed between the first electrode and the second electrode; the second liquid crystal cell 32 further includes a third substrate and a fourth substrate, wherein the third substrate is disposed opposite to the fourth substrate, the third substrate includes a third electrode, and the fourth substrate includes a fourth electrode, and the second liquid crystal layer is disposed between the third electrode and the fourth electrode. The first electrode and the second electrode are configured to have a first voltage difference, and the third electrode and the fourth electrode are configured to have a second voltage difference, when any one of the first voltage difference and the second voltage difference is not zero, a total equivalent retardation amount of the first liquid crystal LC1 in the first liquid crystal layer and the second liquid crystal LC2 in the second liquid crystal layer is less than that of the first liquid crystal in the first liquid crystal layer and the second liquid crystal in the second liquid crystal layer when both the first voltage difference and the second voltage difference are zero.

The structure of the first substrate above-mentioned is not particularly limited herein. For example, the first electrode may be directly formed on the first substrate, alternatively, the first substrate may include a substrate, and the first electrode may be directly formed on the substrate, depending on the actual application particularly. The structure of other substrates may be analogized and will not be described herein.

It should be noted that, the first liquid crystal cell and the second liquid crystal cell may share one substrate, that is, the second substrate and the third substrate may be one substrate.

Figure 3:
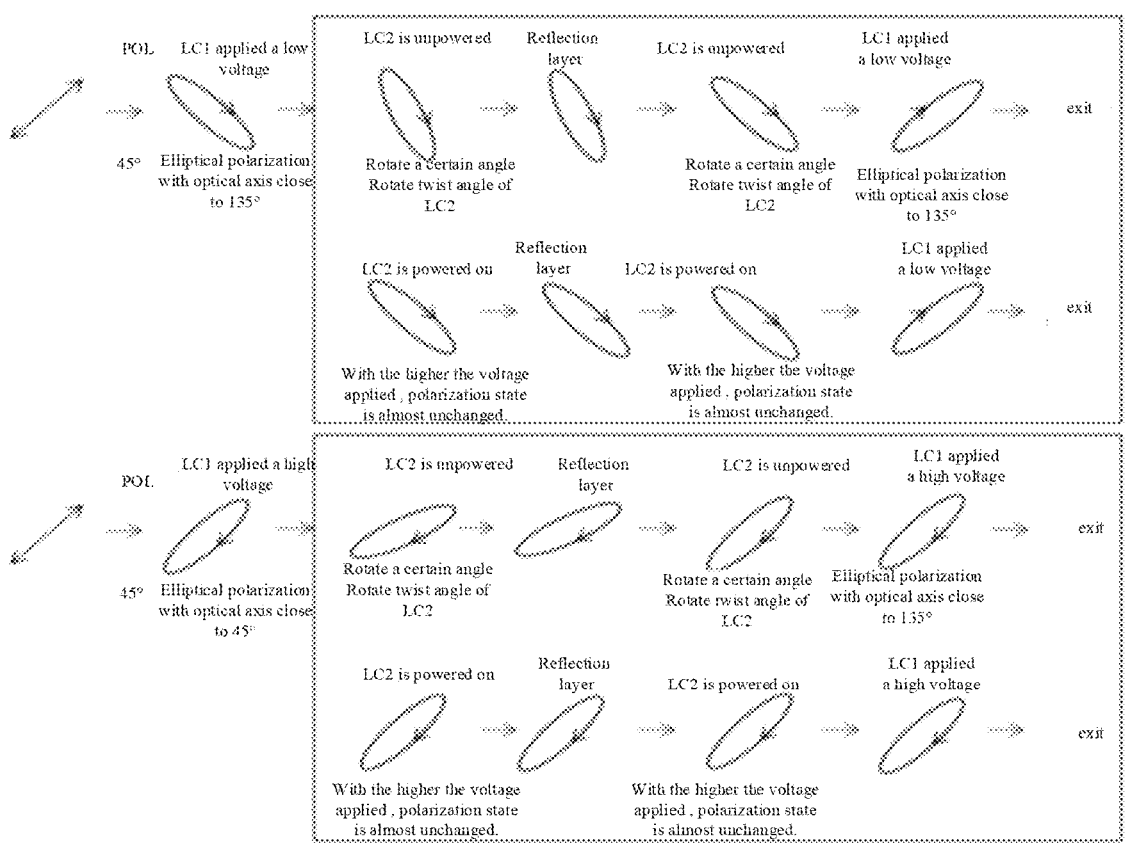
FIG. 3 is a schematic diagram showing the principle of display of the display panel shown in FIG. 1.

Taking the TN liquid crystal as an example, how to make the reflective display panel realize a better color display by controlling the voltage in each of the liquid crystal cells is described in detail below:

In the first liquid crystal LC1 in the liquid crystal layer of the first liquid crystal cell and the second liquid crystal LC2 in the liquid crystal layer of the second liquid crystal cell, the twist angle of one liquid crystal is set close to 90° (large twist angle), and the twist angle of the other liquid crystal is set close to 0° (small twist angle). As shown in FIG. 1 and FIG. 3, the polarization direction of incident light may change with the optical axis direction of the TN liquid crystal when it is not powered on or applied with a low voltage (a voltage that may make the liquid crystal in a non-vertical state). However, when the liquid crystal is applied with a high voltage (a voltage that may make the liquid crystal in a vertical state), the liquid crystal molecules are erected, and the polarization direction of the incident light does not change. Therefore, no matter whether the LC1 and LC2 are applied with a low voltage or a high voltage, the incident light may be emitted, making the display panel appear a bright state. Therefore, under the specific conditions, for example, a specific LC Twist Angle, a specific Rubbing direction and a specific box thickness and the like, the color display may be realized by adjusting the voltage applied on the LC1 and LC2. Wherein, the voltages applied on the LC1 and LC2 may be controlled respectively, which is not particularly limited herein.

Figure 4:
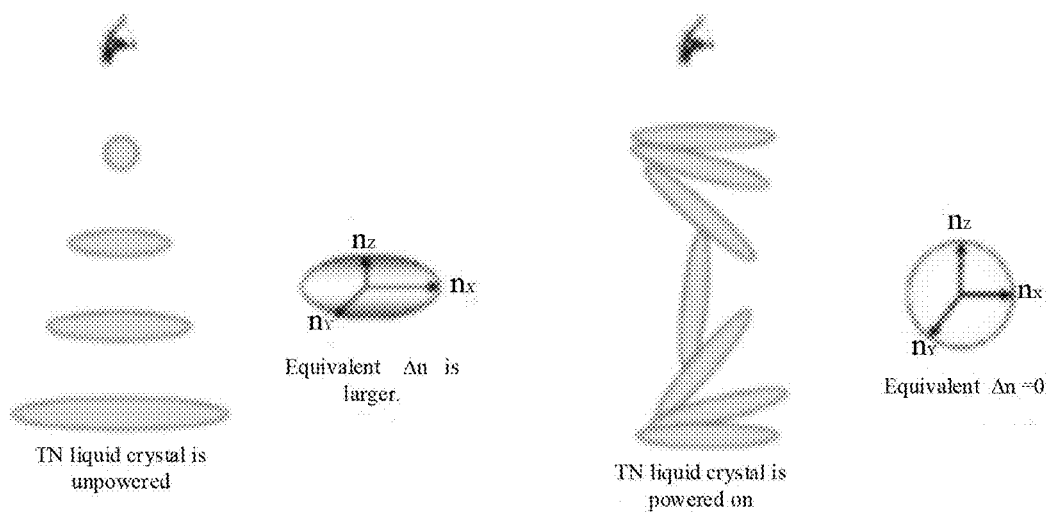
FIG. 4 is a schematic diagram showing the principle of display of the IN liquid crystal display.

Assuming that the twist angle of one liquid crystal in the LC1 and LC2 is 90°, the main function of the liquid crystal cell is to convert the incident light into elliptically polarized light with a long axis close to a certain direction by using the optical rotation of the TN liquid crystal. Therefore, no matter what kind of voltage is applied to the other liquid crystal cell, a portion of the incident light may be emitted via the liquid crystal cell and the reflection unit, to realize the color display. In the present application, the liquid crystals in the liquid crystal layers of the two liquid crystal cells are all the TN liquid crystals, so the birefringence performance of the liquid crystal may be utilized. By applying different voltages on the liquid crystals in the liquid crystal layers of the two liquid crystal cells, the equivalent retardation amount Re. of the liquid crystal may be made different, so that the light transmittance of light in different wavebands is different. As shown in FIG. 4, in case that the TN liquid crystal is under the unpowered on state, the liquid crystal molecules are laid flat and spirally arranged. At this point, the equivalent $\Delta n$ of the liquid crystal molecules is large, so that the equivalent Re. of the liquid crystal cell is large (Re.=$\Delta n \times d$, wherein $\Delta n$ is the refractive index of the liquid crystal and d is the cell thickness). With the higher the voltage of the liquid crystal is applied, the liquid crystal molecules are gradually erected, and the equivalent $\Delta n$ is reduced, that is, the equivalent Re. is reduced.

Equivalent Re. (total)=equivalent Re. (LC1)+equivalent Re. (LC2). When the box thickness of the LC1 is set larger than that of the LC2, and in case that both the LC1 and LC2 are under a non-powered on state, the equivalent Re. of the LC1 is larger than the equivalent Re. of the LC2, and the LC1 may keep the equivalent Re. (total) at a higher level, and the LC2 may keep the equivalent Re. (total) at a lower level. The higher the voltage that applied on the LC1, the lower the equivalent Re. of the LC1 is. In the same way, with the higher the voltage that applied on the LC2, the equivalent Re. of the LC2 is reduced.

According to the principle of light transmittance of the liquid crystal, when the equivalent Re. (total) is larger, the emission amount of light of high-waveband is more, and the display is tending to red. With the decrease of the equivalent Re. (total), the emission amount of light of middle waveband is more, and the display is tending to change from yellow to green. With the equivalent Re. (total) continues to decrease, the emission amount of light of low waveband is increased, and the display is tending to blue. For example, when the LC1 is not powered on or applied with a low voltage, the equivalent Re. of the LC1 is large. At this point, with the higher the voltage is applied on the LC2, the equivalent Re. of the LC2 and the equivalent Re. (total) decrease, but they both remain at a high level, so the display color of the RLCD changes from yellow to green. When the LC1 is applied on a voltage, the equivalent Re. of the LC1 is small or close to 0. In this point, with the higher the voltage is applied on the LC2, the equivalent Re. (total) decreases, so that the display color of the RLCD changes from red to blue. For example, when the LC2 is not powered on or is applied on a low voltage, the equivalent Re. of the LC2 is larger. At this point, with the higher the voltage is applied on the LC1, the equivalent Re. of the LC1 and the equivalent Re. (total) decrease, so that the display color of the RLCD changes from red to blue. When the LC2 is applied with a high voltage, the equivalent Re. of the LC2 is smaller or close to 0. In this point, with the higher the voltage applied on the LC1, the equivalent Re. of the LC1 and the equivalent Re. (total) decrease, and the overall Re. (total) is lower than before, so that the display color of the RLCD changes from green to blue.

Consequently, the reflective display panel provided by the embodiment of the present application may control the voltage of each of the liquid crystal cells to affect the equivalent $\Delta n$, equivalent Re. and so on of the liquid crystal, so that the reflective display panel may realize better color display.

Optionally, under the condition that the first voltage difference is configured to be at a first fixed value, and the second voltage difference is configured to change within a first preset range, the range of the equivalent retardation amount of the first liquid crystal in the first liquid crystal layer includes 200 nm~400 nm; and the range of the equivalent retardation amount of the second liquid crystal in the second liquid crystal layer includes 130-154 nm. Consequently, by changing the voltage of the liquid crystal in the liquid crystal layer of the second liquid crystal cell, the equivalent $\Delta n$ and equivalent Re. of the liquid crystal may be affected, so that the reflective display panel may realize better color display.

The equivalent retardation amount of the first liquid crystal in the first liquid crystal layer is not particularly limited herein. For example, the equivalent retardation amount of the first liquid crystal in the first liquid crystal layer may be 200 nm, 250 nm, 300 nm, 350 nm or 400 nm.

The equivalent retardation amount of the second liquid crystal in the second liquid crystal layer is not particularly limited herein. For example, the equivalent retardation amount of the second liquid crystal in the second liquid crystal layer may be 130 nm, 135 nm, 140 nm, 145 nm or 154 nm.

Optionally, a range of the first fixed value includes 0V~6V; and the first preset range includes 0V~10V.

The first fixed value is not particularly limited herein. For example, the first fixed value above-mentioned may be any one of 0V, 1V, 2V, 3V, 4V, 5V or 6V and so on.

Figure 5:
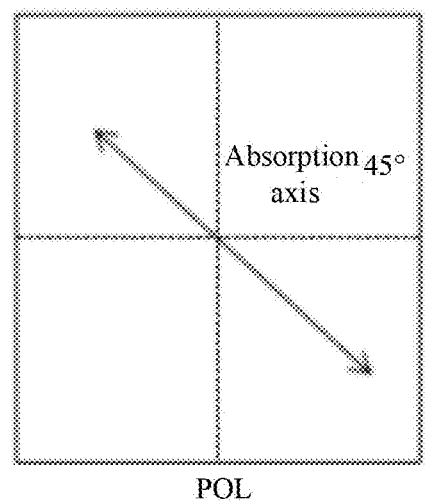
FIG. 5 is a schematic diagram of the direction of a POL absorption axis of the display panel shown in FIG. 1.
Figure 6:
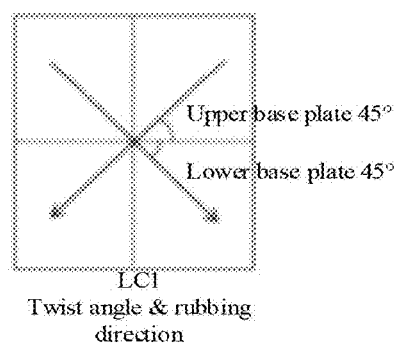
FIG. 6 is a schematic diagram of a Rubbing orientation of the liquid crystal in the display panel shown in FIG. 1.
Figure 7:
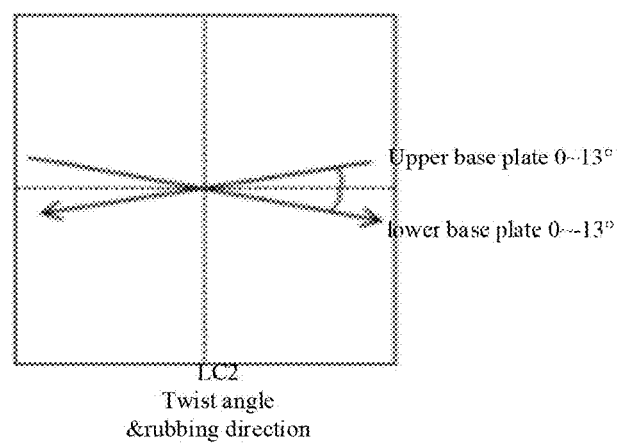
FIG. 7 is a schematic diagram of another Rubbing orientation of the liquid crystal in the display panel shown in FIG. 1.

How to realize various color displays by controlling the voltage applied to the liquid crystal is particularly described below:

Referring to FIGS. 5-7, an absorption axis of the first polarization unit is set to be 135° (the transmission axis is) 45°, the twist angle of the LC1 is set to be 90° (in this point, the Rubbing direction of the first substrate, that is, the Rubbing direction of the upper substrate in FIG. 6, is 45°, and the Rubbing direction of the second substrate, that is, the Rubbing direction of the lower substrate in FIG. 6, is −45°), and the twist angle of the LC2 is set at 0°~26° (in this point, the Rubbing direction of the third substrate, that is, the Rubbing direction of the upper substrate in FIG. 7, is 0°~13°, and the Rubbing direction of the forth substrate, that is, the Rubbing direction of the lower substrate in FIG. 7, is 0°~13°).

Figure 8:
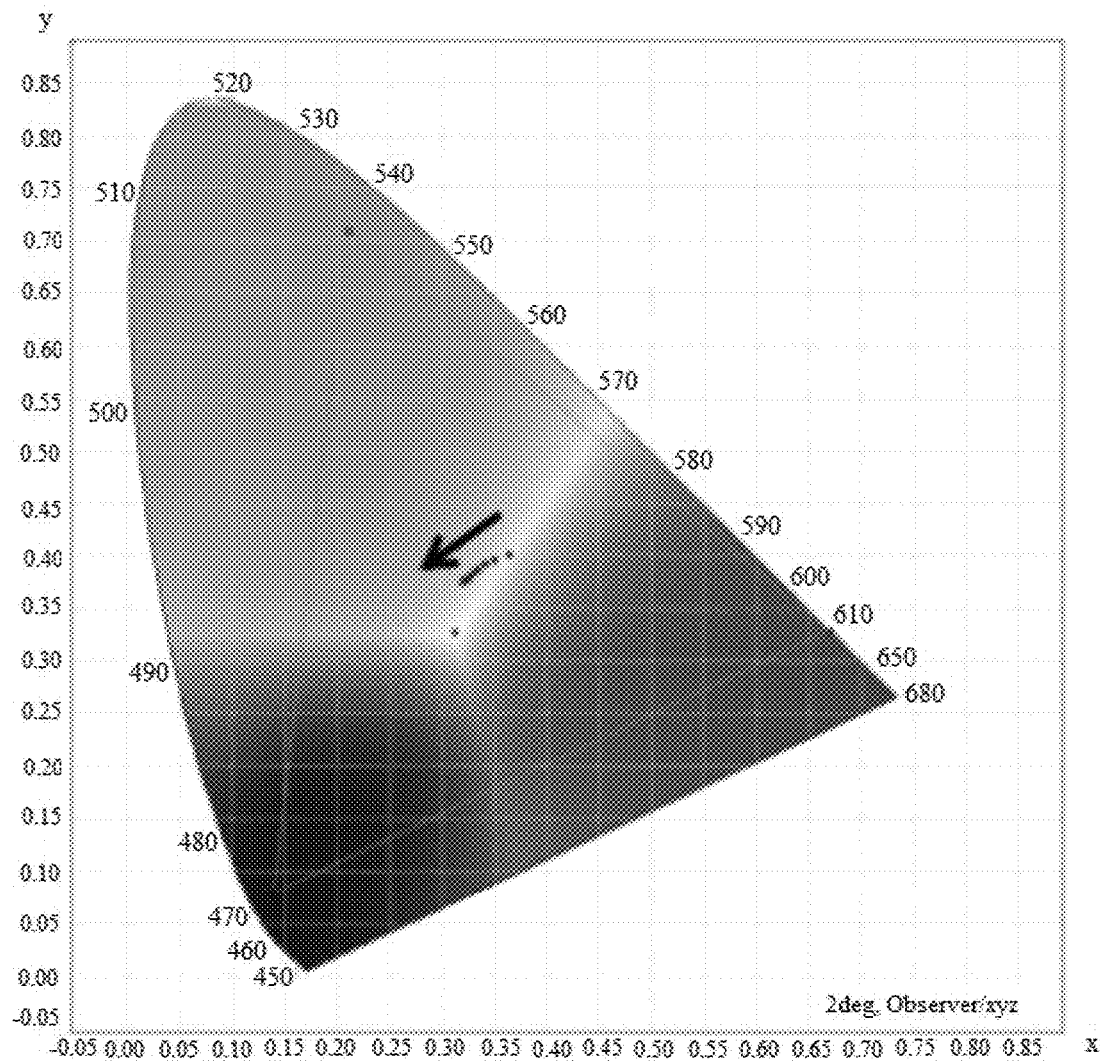
FIG. 8 is a schematic diagram of a first color coordinate of the display panel shown in FIG. 1.

The following defines that the absorption axis of the first polarization unit is 135°, the twist angle of the LC1 is 90°, the twist angle of the LC2 is 0°, the equivalent retardation amount of the LC1 is 270 nm, and the equivalent retardation amount of the LC2 is 140 nm. Tests are performed based on this, and the test results are as follows: when the voltage applied to the LC1 is set to be 0V (not powered on), as shown in Table 1 below and FIG. 8, the voltage of the LC2 is changed from 0V to 10V, and the display color of the RLCD changes from yellow to green.

| First Table | | | | | | | | | | |
|---|---|---|---|---|---|---|---|---|---|---|
| Voltage of the LC2 | From 0 to 10 V | | | | | | | | | |
| Ref. reflectivity | 35.0% | 34.1% | 33.4% | 32.8% | 32.2% | 31.8% | 31.5% | 31.3% | 31.1% | 31.0% | 31.0% |
| chromaticity coordinate (x, y) | 0.364 0.403 | 0.350 0.398 | 0.341 0.393 | 0.335 0.389 | 0.330 0.386 | 0.327 0.383 | 0.324 0.380 | 0.322 0.378 | 0.321 0.377 | 0.320 0.376 | 0.320 0.376 |
| color | yellow→ | | | | | | | | | → green |

In the Table 1 above-mentioned, Ref. represents the reflectivity of the display panel.

Figure 9:
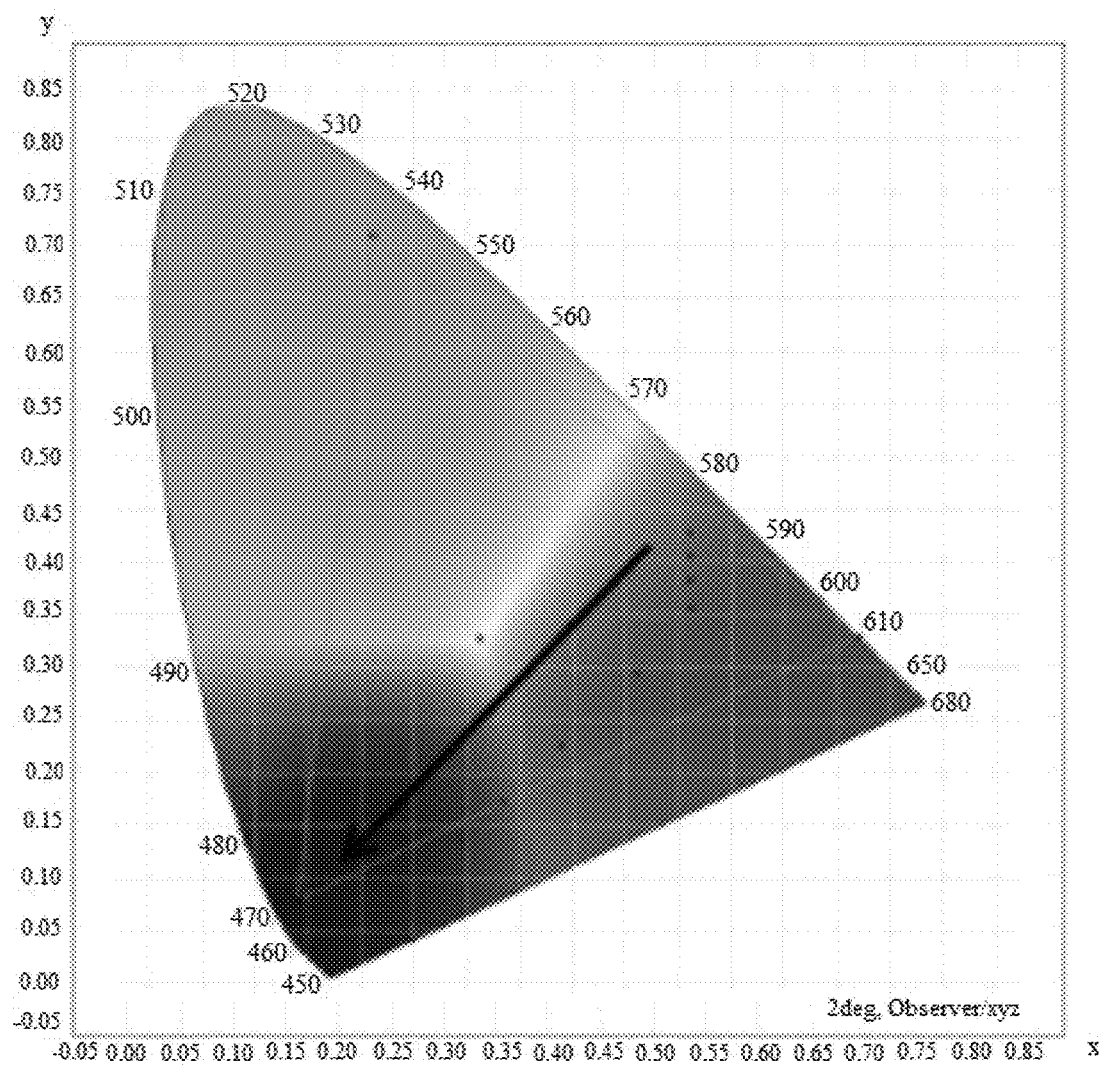
FIG. 9 is a schematic diagram of a second color coordinate of the display panel shown in FIG. 1.

When the voltage applied to the LC1 is set to be 6V (high voltage), as shown in Table 2 below and FIG. 9, the voltage applied to the LC2 is changed from 0V to 10V, and the display color of the RLCD is changed from red to blue.

| Second Table | | | | | | | | | | |
|---|---|---|---|---|---|---|---|---|---|---|
| Voltage of the LC2 | From 0 V to 10 V | | | | | | | | | |
| Ref. reflectivity | 18.9% | 15.0% | 12.1% | 9.7% | 7.7% | 6.0% | 4.7% | 3.7% | 3.0% | 2.7% | 2.6% |
| chromaticity coordinate (x, y) | 0.510 0.429 | 0.510 0.406 | 0.511 0.383 | 0.511 0.357 | 0.460 0.295 | 0.388 0.227 | 0.334 0.174 | 0.294 0.137 | 0.268 0.112 | 0.242 0.094 | 0.217 0.084 |
| color | From red to blue | | | | | | | | | |

In the Table 2 above-mentioned, Ref. represents the reflectivity of the display panel.

Referring to FIGS. 10-12, the absorption axis of the first polarization unit is set to be 135° (the transmission axis is 45°), and the twist angle of the LC1 is set to be 90° (in this point, the Rubbing direction of the first substrate is 45°, and the Rubbing direction of the second substrate) is −45°), the twist angle of the LC2 is set to be 0°~26° (in this point, the Rubbing direction of the third substrate is 0°~13°, and the Rubbing direction of the fourth substrate is 0°~13°), the equivalent retardation amount of the LC1 is set to be 200 nm~400 nm, and the equivalent retardation amount of the LC2 is set to be 130 nm~154 nm.

Tests are performed based on this, and the results are as follows: when the voltage applied to the LC1 is set to be less than 2V (not powered or applied with a low voltage), the voltage applied to the LC2 is changed from 0V to 10V, and the display color of RLCD is changed from yellow to green. When the voltage applied to the LC1 is set to be larger than or equal to 2V (high voltage), the voltage applied to the LC2 is changed from 0V to 10V, and the display color of the RLCD is changed from blue to red.

It should be noted that, the angle of the first polarization unit and the liquid crystal in the liquid crystal layer of the liquid crystal cell may be changed by rotation, as long as the relative relationship is ensured, and it is not limited to a certain particular angle.

Optionally, under the condition that the second voltage difference is configured to be at a second fixed value, and the first voltage difference is configured to change within a second preset rang, the range of the equivalent retardation amount of the first liquid crystal in the first liquid crystal layer includes 240 nm~275 nm; the range of the equivalent retardation amount of the second liquid crystal in the second liquid crystal layer includes 100 nm~200 nm. Consequently, by controlling the equivalent retardation amounts of the liquid crystals in the liquid crystal layers of the two liquid crystal cells, the equivalent Δn, equivalent Re. and so on may be affected, so that the reflective display panel may realize better color display.

The equivalent retardation amount of the first liquid crystal in the first liquid crystal layer above-mentioned is not particularly limited herein. For example, the equivalent retardation amount of the first liquid crystal in the first liquid crystal layer may be 240 nm, 250 nm, 260 nm or 275 nm, and so on.

The equivalent retardation amount of the second liquid crystal in the second liquid crystal layer above-mentioned is not particularly limited herein. For example, the equivalent retardation amount of the second liquid crystal in the second liquid crystal layer may be 100 nm, 130 nm, 170 nm or 200 nm, and so on.

Optionally, a range of the second fixed value range includes 0V~10V; and the second preset range includes 0V~10V.

The second fixed value above-mentioned is not particularly limited herein. For example, the second fixed value may be any one of 0V, 2V, 4V, 5V, 6V, 8V or 10V, and so on.

Figure 13:
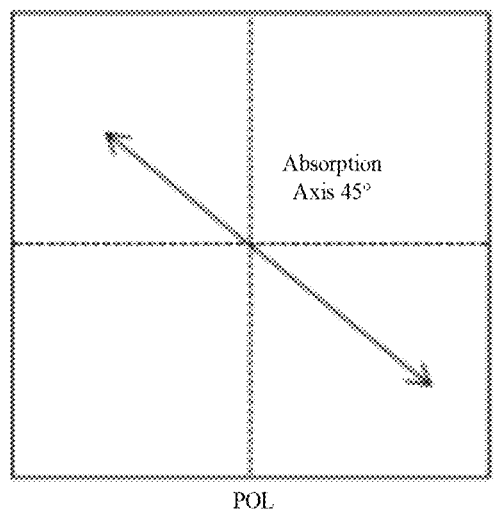
FIG. 13 is a schematic diagram of another POL absorption axis direction in the display panel shown in FIG. 1.
Figure 14:
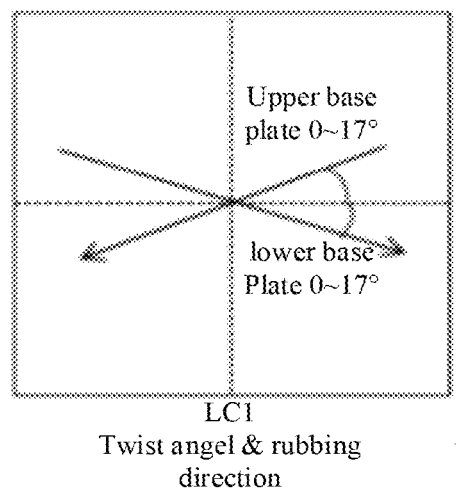
FIG. 14 is a schematic diagram of another Rubbing orientation diagram of the liquid crystal in the display panel shown in FIG. 1.
Figure 15:
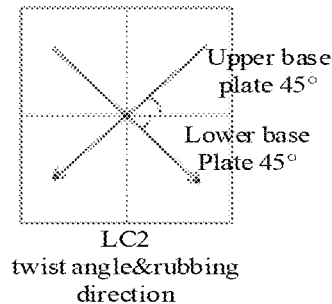
FIG. 15 is a schematic diagram of another Rubbing orientation of the liquid crystal in the display panel shown in FIG. 1.

How to realize various color displays by controlling the voltage applied to the liquid crystal is particularly described below:

Referring to FIGS. 13-15, the absorption axis of the first polarization unit is set to be 135° (the transmission axis is 45°), and the twist angle of the LC1 is set to be 0°~34° (in this point, the Rubbing direction of the first substrate, that is, the Rubbing direction of the upper substrate in FIG. 14, is 0°~17°; the Rubbing direction of the second substrate, that is, the Rubbing direction of the lower substrate in FIG. 14, is 0°~17°), and the twist angle of the LC2 is set to be 90° (in this point, the Rubbing direction of the third substrate, that is, the Rubbing direction of the upper substrate in FIG. 15, is 45°; the Rubbing direction of the fourth substrate, that is, the Rubbing direction of the lower substrate in FIG. 15, is −45°).

Figure 16:
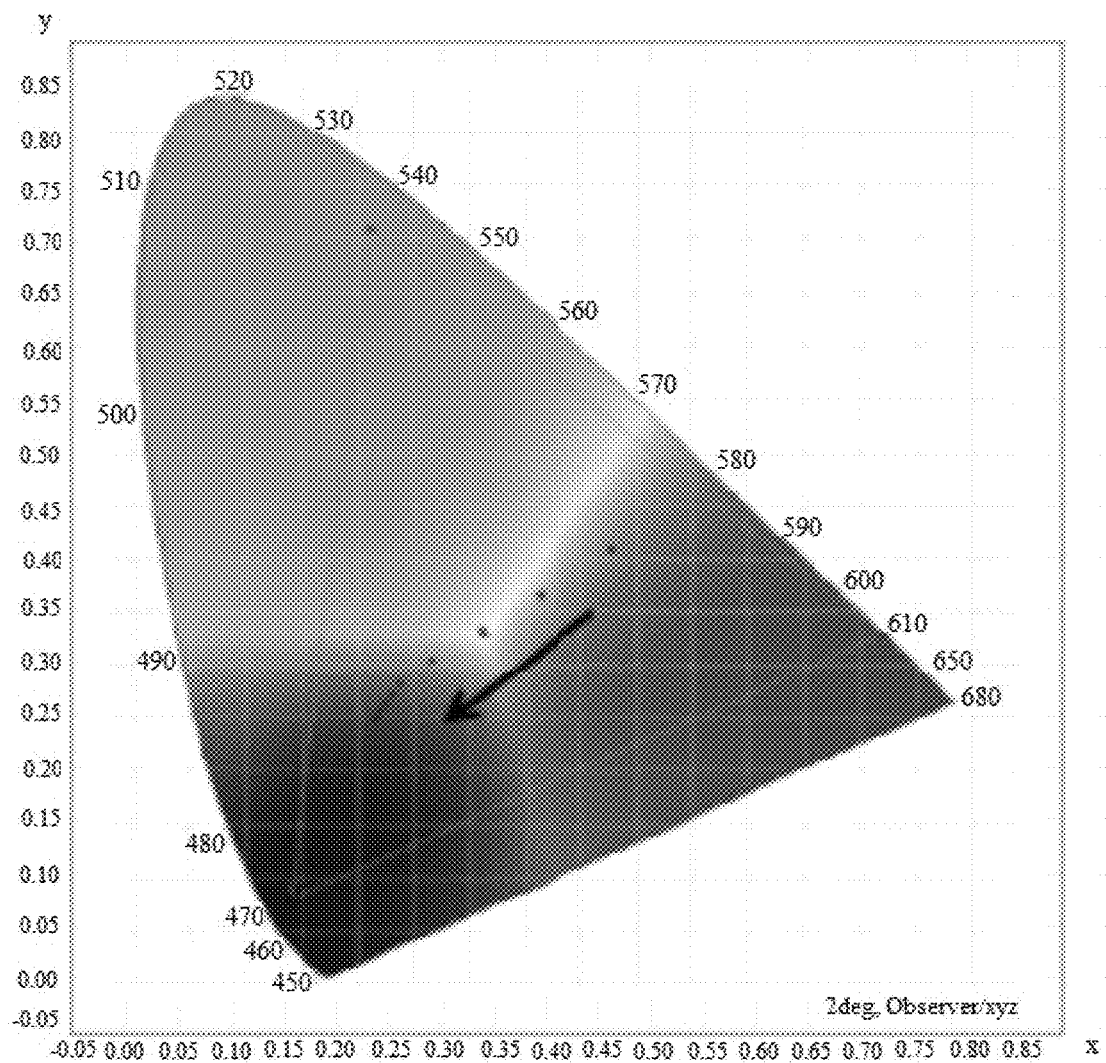
FIG. 16 is a schematic diagram of a third color coordinate of the display panel shown in FIG. 1.

The following defines that the absorption axis of the first polarization unit is 135°, the twist angle of the LC1 is 20° (in this point, the Rubbing direction of the first substrate is 10°; the Rubbing direction of the second substrate is −10°), the twist angle of the LC2 is 90°, the equivalent retardation amount of the LC1 is 270 nm, and the equivalent retardation amount of the LC2 is 140 nm. Tests are performed based on this, and the results are as follows: When the voltage applied to the LC2 is set to be 0V (not powered on), as shown in Table 3 below and FIG. 16, the voltage of LC1 is changed from 0V to 10V, and the display color of the RLCD may be changed from red to blue.

| Third Table | | | | | | | | | | |
|---|---|---|---|---|---|---|---|---|---|---|
| Voltage of the LC1 | From 0 to 10 V | | | | | | | | | |
| Ref. | 27.9% | 24.2% | 21.6% | 19.4% | 17.5% | 15.9% | 14.7% | 13.8% | 13.2% | 12.8% | 12.7% |
| chromaticity coordinate (x, y) | 0.427 0.409 | 0.361 0.366 | 0.311 0.334 | 0.266 0.305 | 0.237 0.284 | 0.230 0.274 | 0.224 0.265 | 0.220 0.258 | 0.216 0.253 | 0.214 0.251 | 0.214 0.250 |
| color | From red to blue | | | | | | | | | |

In the Table 3 above-mentioned, Ref. represents the reflectivity of the display panel.

Figure 17:
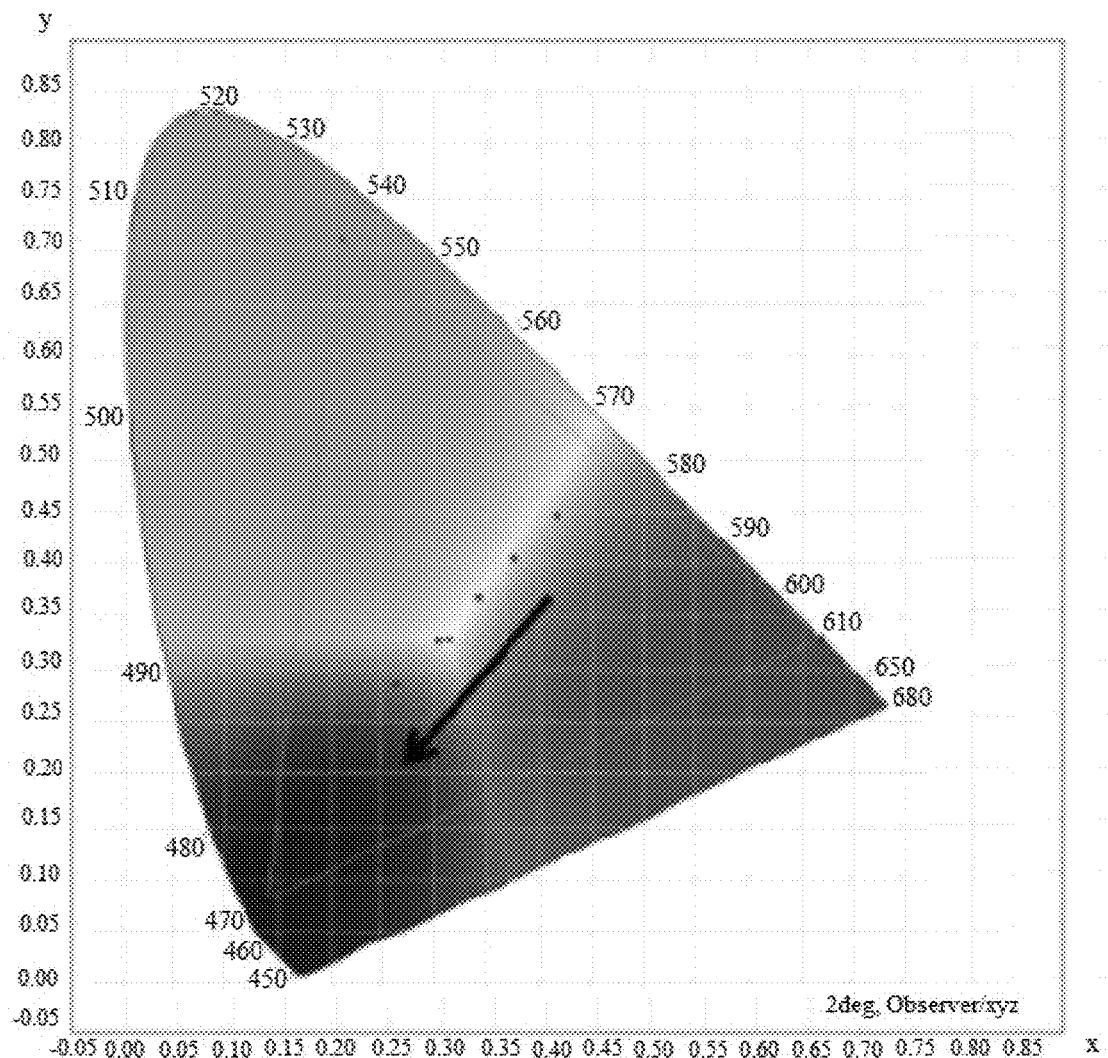
FIG. 17 is a schematic diagram of a fourth color coordinate of the display panel shown in FIG. 1.

When the voltage applied to the LC2 is set to be 3V (low voltage), as shown in Table 4 below and FIG. 17, the voltage applied to the LC1 is changed from 0V to 10V, and the display color of the RLCD may be changed from yellow to blue.

| Fourth Table | | | | | | | | | | |
|---|---|---|---|---|---|---|---|---|---|---|
| Voltage of the LC1 | From 0 to 10 V | | | | | | | | | |
| Ref. | 33.2% | 26.3% | 21.4% | 17.2% | 13.6% | 10.7% | 8.4% | 6.7% | 5.5% | 4.9% | 4.7% |
| chromaticity coordinate (x, y) | 0.417 0.447 | 0.377 0.406 | 0.341 0.368 | 0.3036 0.328 | 0.263 0.286 | 0.224 0.245 | 0.192 0.210 | 0.184 0.193 | 0.178 0.179 | 0.175 0.169 | 0.174 0.167 |
| color | From red to blue | | | | | | | | | |

In the Table 4 above-mentioned, Ref. represents the reflectivity of the display panel.

Figure 18:
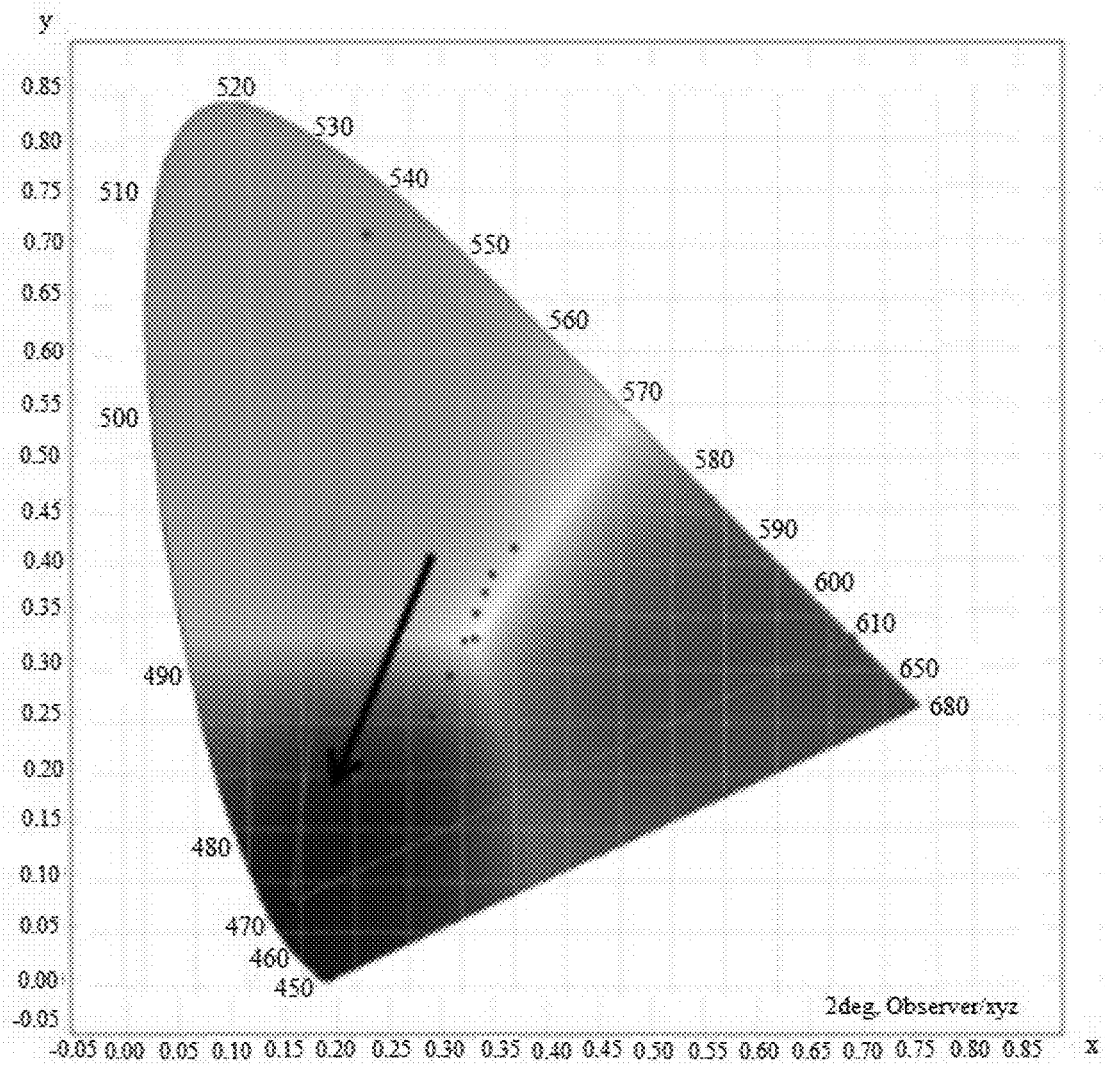
FIG. 18 is a schematic diagram of a fifth color coordinate of the display panel shown in FIG. 1.

When the voltage applied to the LC2 is set to be 10V (high voltage), as shown in the fifth Table and FIG. 18 below, the voltage applied to the LC1 is change from 0V to 10V, and the display color of the RLCD may be changed from green to blue.

| Fifth Table | | | | | | | | | | |
|---|---|---|---|---|---|---|---|---|---|---|
| Voltage of the LC1 | From 0 V to 10 V | | | | | | | | | |
| Ref. | 33.1% | 25.7% | 20.3% | 15.7% | 11.8% | 8.7% | 6.2% | 4.3% | 3.1% | 2.4% | 2.2% |
| chromaticity coordinate (x, y) | 0.350 0.415 | 0.330 0.390 | 0.323 0.374 | 0.314 0.353 | 0.302 0.327 | 0.288 0.295 | 0.272 0.257 | 0.254 0.216 | 0.237 0.177 | 0.226 0.151 | 0.222 0.143 |
| color | From red to blue | | | | | | | | | |

In the fifth Table above-mentioned, Ref. represents the reflectivity of the display panel.

Referring to FIGS. 19~21, the absorption axis of the first polarization unit is set to be 135° (the transmission axis is 45°), and the twist angle of the LC1 is set to be 0°~34° (in this point, the Rubbing direction of the first substrate is 0-17°; the Rubbing direction of the second substrate is 0°~17°, the twist angle of the LC2 is 90°, the equivalent retardation amount of the LC1 is set to be 240 nm~275 nm, and the equivalent retardation amount of the LC2 is set to be 100 nm~200 nm.

Tests are performed based on this, and the results are as follows: when the voltage applied to the LC2 is set to be less than or equal to 2V (not powered on or applied a low voltage), the voltage applied to the LC1 is changed from 0V to 10V, and the display color of the RLCD may be changed from red to blue. When the voltage applied to the LC1 is set to be great than 2V and less than or equal to 5V (medium voltage), the voltage applied to the LC1 is changed from 0V to 10V, and the display color of the RLCD may be changed from yellow to blue. When the voltage applied to the LC2 is set to be larger than 5V (high voltage), the voltage applied to the LC1 is changed from 0V to 10V, and the display color of the RLCD may be changed from green to blue.

The angle of the first polarization unit and the liquid crystal in the liquid crystal layer of the liquid crystal cell may be changed by rotation, as long as the relative relationship is ensured, and it is not limited to a certain particular angle.

Figure 22:
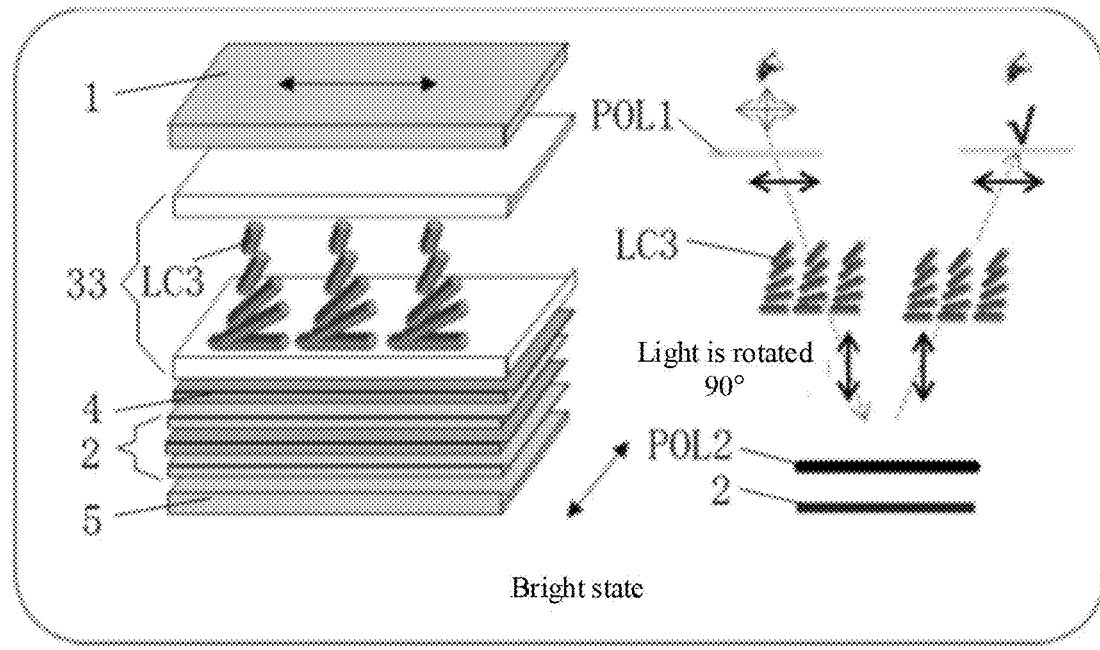
FIG. 22 is a principle schematic diagram of displaying a bright state of the display panel shown in FIG. 2.
Figure 23:
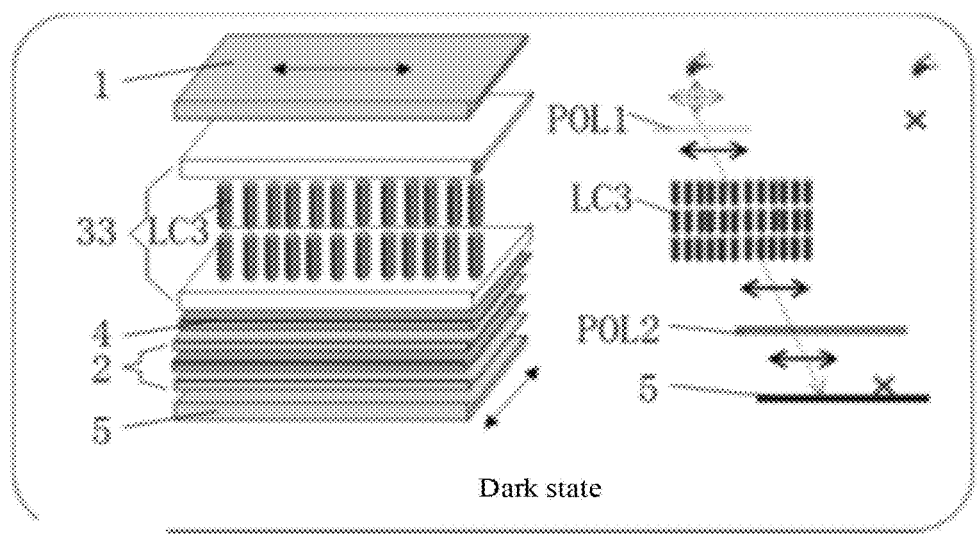
FIG. 23 is a principle schematic diagram of displaying a dark state of the display panel shown in FIG. 2.

Optionally, referring to FIG. 2, FIG. 22 and FIG. 23, the display panel includes a third liquid crystal cell 33 disposed between the first polarization unit 1 and the reflection unit 2, and the display panel further includes a second polarization unit 4.

Referring to FIG. 22 and FIG. 23, the second polarization unit 4 is disposed at a side of the reflection unit close to the third liquid crystal cell 33. Alternatively, referring to FIG. 2, the second polarization unit 4 is disposed at a side of the reflection unit far away from the third liquid crystal cell 33.

Referring to FIG. 2. FIG. 22 and FIG. 23, the third liquid crystal cell 33 includes a third liquid crystal layer, and a range of an equivalent retardation amount of a third liquid crystal LC3 in the third liquid crystal layer includes 321 nm~441 nm.

The structure of the third liquid crystal cell above-mentioned is not particularly limited herein. For example, the third liquid crystal cell may include a fifth substrate and a sixth substrate which are oppositely disposed, and a third liquid crystal layer disposed between the fifth substrate and the sixth substrate.

The first polarization unit above-mentioned has a first light transmission axis, and is configured to generate polarized light with a polarization direction parallel to the first light transmission axis after incident light is emitted to the first polarization unit.

The second polarization unit has a second light transmission axis, and is configured to enable light with a polarization direction parallel to the second light transmission axis to be transmitted, and to enable light with a polarization direction perpendicular to the second light transmission axis to be reflected.

The material and type of the second polarization unit above-mentioned are not particularly limited herein. For example, the materials of the second polarization unit may include polyvinyl alcohol (PVA), polyvinyl chloride (PVC) and cellulose triacetate (TAC) and the like. The types of the second polarization unit may include a linear polarizer and an optical grating and the like. Further alternatively, the second polarization unit may include TAC, PVA, TAC and pressure sensitive adhesive (PSA) which are sequentially stacked.

The equivalent retardation amount of the third liquid crystal in the third liquid crystal layer above-mentioned is not particularly limited herein. For example, the equivalent retardation amount of the third liquid crystal in the third liquid crystal layer may be 321 nm, 350 nm, 380 nm, 400 nm or 441 nm, and so on.

It should be noted that, the display panel above-mentioned may also include a plurality of liquid crystal cells, and the plurality of liquid crystal cells are disposed between the first polarization unit and the reflecting unit. Each of the liquid crystal cells includes a liquid crystal layer, and a range of the equivalent retardation of the liquid crystals in each of the liquid crystal layers includes 321 nm~441 nm. In this point, the equivalent retardation amounts of each of the liquid crystals in the plurality of liquid crystal layers may all be the same. Alternatively, the equivalent retardation amounts of each of the liquid crystals in the plurality of liquid crystal layers may all be different. Alternatively, the equivalent retardation amounts of each of the liquid crystals in the plurality of liquid crystal layers may be partially the same, which is not particularly limited herein.

The second polarization unit 4 in FIGS. 2, 22 and 23 may be abbreviated as POL2.

With reference to FIG. 22 and FIGS. 23, the display principle of the display panel will be described below.

Referring to FIG. 22, external light is emitted to the first polarization unit 1 (abbreviated as POL1) with the first transmission axis in the direction shown by the arrow in FIG. 22, and linearly polarization light with a polarization direction parallel to the first transmission axis is capable of being obtained. After the linearly polarization light transmitting through POL1 is emitted to the liquid crystal LC3 in the unpowered on liquid crystal layer, the polarization direction is rotated by 90° as shown in FIG. 22, that is, light with a polarization direction perpendicular to the first transmission axis is obtained. This light with the polarization direction perpendicular to the first transmission axis is emitted to the second polarization unit 4 (abbreviated as POL2) and the reflection unit 2, reflected by the reflection unit 2, transmitting through the liquid crystals LC3 and POL1 again, and entering human eyes thereafter without being absorbed by the absorption unit 5 (not shown in the figure). In this point, the display panel is in a bright state.

Referring to FIG. 23, external light is emitted to the POL1 with the first transmission axis as shown by the arrow in FIG. 23, linearly polarization light with a polarization direction parallel to the first transmission axis is capable of being obtained. After the linearly polarization light transmitting through the POL1 is emitted to the liquid crystal LC3 in the liquid crystal layer applied with a voltage, the polarization direction does not change and is still the direction shown by the arrow in FIG. 23. That is, light with a polarization direction parallel to the first transmission axis is obtained. After the light with the polarization direction parallel to the first transmission axis is emitted to the POL2 and the reflection unit (not shown in the figure), the polarization direction is still parallel to the first transmission axis, and finally it is absorbed by the absorption unit 5, and no light is reflected into human eyes. In this point, the display panel is in a dark state.

It should be noted that, the reflection unit 2 and the second polarization unit 4 in FIG. 2 may be integrated together, for example, an Advanced Polarizer Film (APF), the APF may have a second transmission axis, this second transmission axis may transmit light with a polarization direction parallel to the second transmission axis and reflect light with a polarization direction perpendicular to the second transmission axis. That is, the APF in this point may not only absorb light, but may also have a polarization effect, this polarization effect is similar to the second polarization unit. In this case, the second polarization unit may be omitted, so that the reflection unit is capable of realizing a reflection effect and meanwhile having a polarization function.

Figure 24:
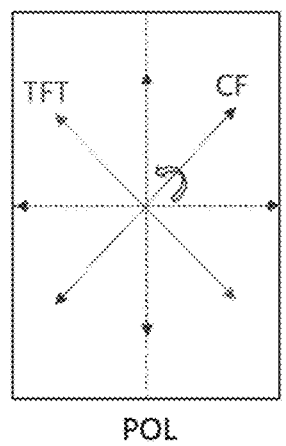
FIG. 24 is a schematic diagram of a POL absorption axis direction of the display panel shown in FIG. 2.
Figure 25:
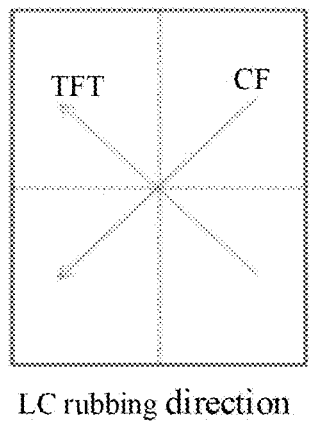
FIG. 25 is a schematic diagram of a Rubbing orientation of the display panel shown in FIG. 2.

How to realize various color display according to the equivalent retardation amount of the liquid crystal is described in detail below:

Referring to FIG. 24 and FIG. 25, the absorption axis of the first polarization unit is set to be 45°, the absorption axis of the second polarization unit is set to be −45°, and the twist angle of the liquid crystal LC3 in the liquid crystal layer of the third liquid crystal cell is set to be 90° (in this point, the Rubbing direction of the fifth substrate, that is, the Rubbing direction of a thin film transistor (TFT) in FIG. 25, is 45°, and the Rubbing direction of the sixth substrate, that is, the Rubbing direction of a color filter (CF) in FIG. 25, is 45°). It should be noted that, the CF herein refers to a substrate does not have the filter function of colors for example R, G, B and the like.

Figure 26:
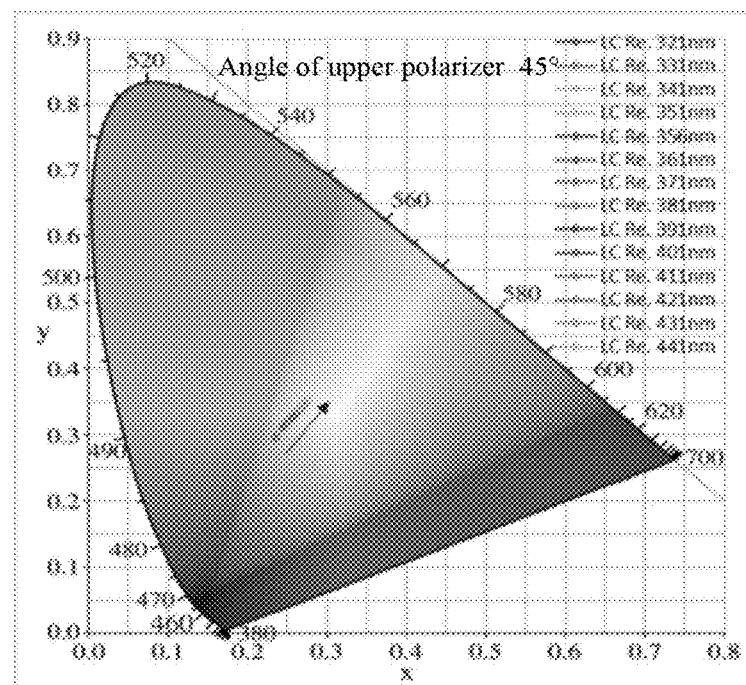
FIG. 26 is a schematic diagram of a color coordinate of the display panel shown in FIG. 2.
Figure 27:
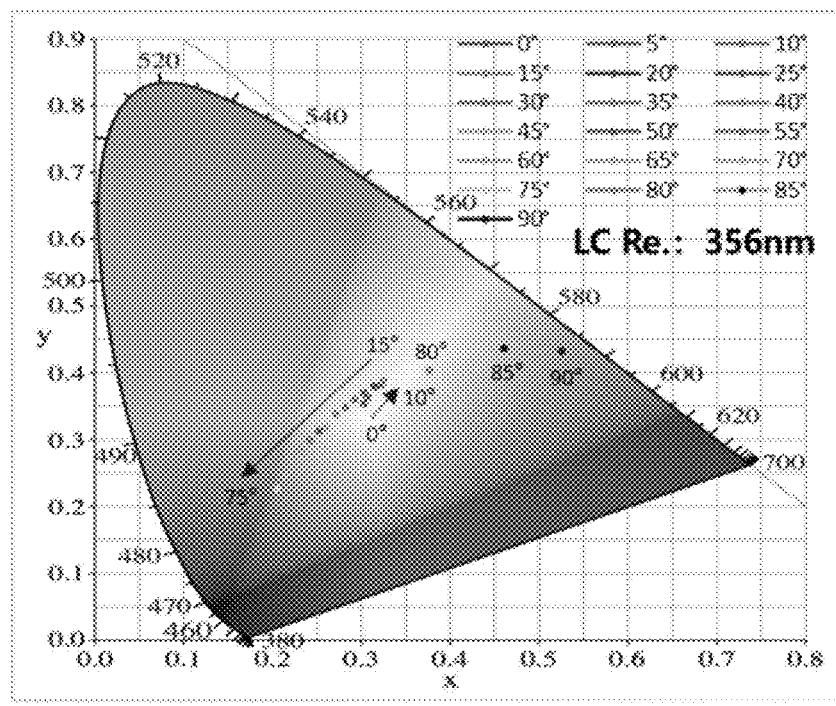
FIG. 27 is a schematic diagram of another color coordinate diagram of the display panel shown in FIG. 2.

The following defines that the absorption axis of the first polarization unit is 45°, the absorption axis of the second polarization unit is −45°, and the twist angle of the liquid crystal LC3 is 90°. Tests are performed based on the above-mentioned, and the results are as follows: as shown in Table 6 below and FIG. 26, when the equivalent retardation amount of the LC3 is changed from 321 nm to 381 nm, the RLCD displays blue. When the equivalent retardation amount of the LC3 is 321 nm and 331 nm, the blue saturation of the RLCD displays higher blue saturation and the display effect of the blue is better. When the equivalent retardation amount of the LC3 is 341 nm and 381 nm, the RLCD displays light blue.

When the equivalent retardation amount of the LC3 is changed from 381 nm to 441 nm, the RLCD displays green. When the equivalent retardation amount of the LC3 is changed from 391 nm to 411 nm, the RLCD displays green, and the display effect of the green is better in this point. When the equivalent retardation amount of the LC3 is changed from 421 nm to 441 nm, the saturation of the RLCD displays green is gradually reduced, and the display gradually tends to yellow.

Sixth Table

| LC Re. (nm) | 321 | 331 | 341 | 351 | 356 | 361 | 371 | 381 | 391 | 401 | 411 | 421 | 431 | 441 |
|---|---|---|---|---|---|---|---|---|---|---|---|---|---|---|
| reflectivity | 13.79 | 14.97 | 16.17 | 17.38 | 17.99 | 18.60 | 19.82 | 21.02 | 22.21 | 23.36 | 24.48 | 25.56 | 26.58 | 27.54 |
| White Wx | 0.263 | 0.265 | 0.268 | 0.271 | 0.273 | 0.274 | 0.278 | 0.281 | 0.285 | 0.289 | 0.293 | 0.297 | 0.301 | 0.305 |
| state Wy | 0.301 | 0.305 | 0.310 | 0.314 | 0.316 | 0.319 | 0.324 | 0.328 | 0.333 | 0.338 | 0.344 | 0.349 | 0.354 | 0.359 |
| Color | | | | | blue | | | | | | | green | | |

In the sixth Table above-mentioned, Ref. represents the reflectivity of the display panel.

It should be noted that, from the equivalent retardation amount Re.=Δn×d, it may be known that, the equivalent retardation amount of the liquid crystal is proportional to the cell thickness of liquid crystal, so that the change of the equivalent retardation amount of the liquid crystal may be realized by changing the cell thickness of the liquid crystal.

FIGS. 8~12, FIGS. 16~21 and FIGS. 26~27 are all schematic diagrams of the color coordinate, in this color coordinate, the horizontal axis is X, and the vertical axis is Y, so that a point may be determined on a chromaticity diagram, this point represents a light-emitting color.

In the display panel provided by the embodiment of the present application, by controlling the liquid crystal and cell thickness in the liquid crystal cell, enabling a target light with a specific color wavelength may enter human eyes, so that different color displays may be realized.

Optionally, the third liquid crystal cell further includes a fifth substrate and a sixth substrate, the fifth substrate and the sixth substrate are disposed opposite to each other, the fifth substrate includes a fifth electrode, and the sixth substrate includes a sixth electrode, and the third liquid crystal layer is arranged between the fifth electrode and the sixth electrode; and the fifth electrode and the sixth electrode are configured to have a third voltage difference, and a range of the third voltage difference includes 0V~6V. Consequently, by controlling the voltage applied to the liquid crystal cell, the equivalent Δn and equivalent Re. of the liquid crystal may be affected, and the reflective display panel may realize a better color display thereafter.

The structure of the fifth substrate is not particularly limited herein. For example, the fifth electrode may be directly formed on the fifth substrate. Alternatively, the fifth substrate may include a substrate, and the fifth electrode may be directly formed on the substrate, depending on the actual application.

The structure of the sixth substrate is not particularly limited herein. For example, the sixth electrode may be directly formed on the fifth substrate. Alternatively, the sixth substrate may include a substrate, and the sixth electrode may be directly formed on the substrate, depending on the actual application.

The third voltage difference is not particularly limited herein. For example, the third voltage difference may be 0V, 2V, 4V, 5V or 6V and so on.

Optionally, a transmission axis of the second polarization unit is not parallel to the transmission axis of the first polarization unit.

The transmission axis of the second polarization unit and the transmission axis of the first polarization unit are not particularly limited herein. For example, an included angle between the transmission axis of the second polarization unit and the transmission axis of the first polarization unit may be 45°, 90° or 135°, and so on.

In the display panel provided by the embodiment of the present application, the first polarization unit has the first transmission axis, and is capable of generating polarized light with a polarization direction parallel to the first transmission axis, so that the light transmission in a particular direction may be controlled by changing the included angle between the transmission axis of the first polarization unit and the transmission axis of the second polarization unit, and in combination with the liquid crystal cell, the reflective display panel may realize different color displays.

Optionally, the transmission axis of the second polarization unit is perpendicular to the transmission axis of the first polarization unit.

How to realize various color displays according to the included angle between the transmission axis of the second polarization unit and the transmission axis of the first polarization unit is described in detail below:

Referring to FIG. 24 and FIG. 25, the absorption axis of the first polarization unit is set to be 45°, the absorption axis of the second polarization unit is set to be −45°, and the twist angle of the liquid crystal LC3 in the liquid crystal layer of the third liquid crystal cell is set to be 90° (in this point, the Rubbing direction of the fifth substrate is 45°; the Rubbing direction of the sixth substrate is 45°).

The following defines that the absorption axis of the first polarization unit is 45°, the absorption axis of the second polarization unit is −45°, the twist angle of LC3 is 90°, and the equivalent retardation amount of the LC3 is 356 nm. Tests are performed based on this, and the results are as follows: as shown in seventh Table below and FIG. 27, when the absorption axis of the second polarization unit is controlled to be −45°, and the angle of the absorption axis of the first polarization unit is changed from 0° to 25°, the RLCD gradually displays yellow. When the absorption axis of the first polarization unit is 0° and 5°, the RLCD displays light yellow. When the absorption axis of the first polarization unit is 10°, 15° and 20°, the yellow saturation of the RLCD is higher and the display effect is better.

When the absorption axis of the first polarization unit is changed from 25° to 75°, the RLCD gradually displays blue-green. When the absorption axis of the first polarization unit is 25° and 30°, the RLCD displays yellow-green. When the absorption axis of the first polarization unit is 35° and 40°, the RLCD displays light green, and in this point, the display effect of the green is the best. When the absorption axis of the first polarization unit is 45° and 50°, the RLCD displays light blue. When the absorption axis of the first polarization unit changes from 55° to 75°, the saturation of the blue displayed by the RLCD gradually increases.

When the absorption axis of the first polarization unit is changed from 80° to 90°, the RLCD gradually displays yellow and orange. When the absorption axis of the first polarization unit is 80°, the saturation of yellow displayed by the RLCD is the highest. When the absorption axis of the first polarization unit is 85° and 90°, the RLCD displays orange.

Seventh Table

| | | | | | | | | | |
|---|---|---|---|---|---|---|---|---|---|
| LC Re. | 356 nm | — | — | — | — | — | — | — | — |
| Angle of upper polarizer | 0° | 5° | 10° | 15° | 20° | 25° | 30° | 35° | 40° |
| Angle of lower polarizer | 135° | — | — | — | — | — | — | — | — |
| White $W_x$ | 0.315 | 0.320 | 0.335 | 0.339 | 0.328 | 0.317 | 0.306 | 0.296 | 0.286 |
| state $W_y$ | 0.351 | 0.360 | 0.379 | 0.384 | 0.375 | 0.366 | 0.356 | 0.346 | 0.334 |
| $R_{white}$ | 25.69 | 27.67 | 28.97 | 29.49 | 29.20 | 28.11 | 26.31 | 23.91 | 21.08 |
| color | Bright yellow | | | Yellow | | | Yellow green | | Bright green |

| | | | | | | | | | | |
|---|---|---|---|---|---|---|---|---|---|---|
| LC Re. | — | — | — | — | — | — | — | — | — | — |
| Angle of upper polarizer | 45° | 50° | 55° | 60° | 65° | 70° | 75° | 80° | 85° | 90° |
| Angle of lower polarizer | — | — | — | — | — | — | — | — | — | — |
| White $W_x$ | 0.273 | 0.266 | 0.256 | 0.246 | 0.237 | 0.228 | 0.219 | 0.390 | 0.474 | 0.537 |
| state $W_y$ | 0.316 | 0.309 | 0.295 | 0.280 | 0.263 | 0.244 | 0.224 | 0.399 | 0.433 | 0.428 |
| $R_{white}$ | 17.99 | 14.85 | 11.81 | 9.02 | 6.59 | 4.59 | 3.02 | 1.88 | 1.10 | 0.61 |
| color | Bright blue | | | | blue | | | yellow | Orange | |

Optionally, referring to FIG. 2, the display panel further includes an absorption unit 5 configured to absorb light parallel to the transmission axis of the second polarization unit 4. Under the condition that the second polarization unit 4 is disposed at a side of the reflection unit close to the third liquid crystal cell 33, the absorption unit 5 is disposed at a side of the reflection unit far away from the second polarization unit 4. Under the condition that the second polarization unit 4 is disposed at a side of the reflection unit far away from the third liquid crystal cell 33, the absorption unit 5 is disposed at a side of the second polarization unit 4 far away from the reflection unit. Consequently, light may be absorbed by the absorption unit to ensure high contrast and the like of the reflective display panel.

Optionally, the absorption unit includes black ink or a third polarization unit, and a transmission axis of the third polarization unit is perpendicular to the transmission axis of the second polarization unit. Consequently, it is easier to form an absorption unit, which is simple and easy to implement.

The third polarization unit above-mentioned may have a third transmission axis configured to absorb polarized light parallel to the second transmission axis.

The embodiment of the application also provides a display device, the display device includes the display panel above-mentioned.

The above-mentioned display device may be a rigid display device (that is, a display screen that is uncapable to be bent), which is not limited herein. The display device above-mentioned may be a LCD display device, and further may be a reflective type LCD display device. The display device above-mentioned may be any products or components with display function, for example a TV, a digital camera, a mobile phone, a tablet computer, and so on. The display device above-mentioned may also be applied to the fields of identity recognition, medical devices and the like. The products that have been popularized or have good popularization prospects include security identity authentication, smart door locks, medical image acquisition and the like. The display device has the advantages of high reflectivity, various display may be realized, low cost, fast response time, high environmental reliability, good display effect, long service life, high stability, high contrast, good imaging quality and high product quality and the like.

The description provided herein describes many concrete details. However, it may be understood that, the embodiments of the present disclosure may be implemented without these concrete details. In some embodiments, well-known methods, structures and techniques are not described in detail, to not obscure the understanding of the description.

The present disclosure is intended to cover any variations, applications, or adaptive changes of the present disclosure. These variations, applications, or adaptive changes follow the general principles of the present disclosure and include common general knowledge or conventional technical means in the technical field, which are not disclosed herein. The specification and the embodiments are considered as being exemplary merely, with a true scope and spirit of the present disclosure being indicated by the following claims.

The invention claimed is:

1. A display panel, comprising:
a first polarization unit;
a reflection unit disposed opposite to the first polarization unit; and
at least one liquid crystal cell disposed between the first polarization unit and the reflection unit; the liquid crystal cell comprises a liquid crystal layer, and a liquid crystal in the liquid crystal layer has birefringence and optical rotation, and a range of a total equivalent retardation amount of the liquid crystals in all the liquid crystal cells comprises 100 nm~441 nm;
wherein the display panel at least comprises a first liquid crystal cell and a second liquid crystal cell, wherein the first liquid crystal cell is disposed between the first polarization unit and the second liquid crystal cell, and the second liquid crystal cell is disposed between the first liquid crystal cell and the reflection unit;
the first liquid crystal cell comprises a first liquid crystal layer, and the second liquid crystal cell comprises a second liquid crystal layer, and an equivalent retardation amount of a first liquid crystal in the first liquid crystal layer is larger than that of a second liquid crystal in the second liquid crystal layer.

2. The display panel according to claim 1, wherein a twist angle range of the liquid crystal in the liquid crystal layer of each of the liquid crystal cells comprises 0°~90°.

3. The display panel according to claim 2, wherein the liquid crystal in the liquid crystal layer of each of the liquid crystal cells is cholesteric liquid crystal; and
   each of the liquid crystal cells further comprises two electrodes disposed opposite to each other, and the cholesteric liquid crystal is located between the two electrodes disposed opposite to each other.

4. A display device comprising the display panel according to claim 1.

5. The display panel according to claim 3, wherein the display panel comprises the first liquid crystal cell and the second liquid crystal cell, and a range of the equivalent retardation amount of the first liquid crystal in the first liquid crystal layer comprises 200 nm~400 nm; and
   a range of the equivalent retardation amount of the second liquid crystal in the second liquid crystal layer comprises 100 nm~200 nm.

6. The display panel according to claim 5, wherein an equivalent optical axis direction of the first liquid crystal in the first liquid crystal layer is the same as an equivalent optical axis direction of the second liquid crystal in the second liquid crystal layer, and a range of the included angle of both the equivalent optical axis direction with a transmission axis of the first polarization unit comprises 42°~48°.

7. The display panel according to claim 6, wherein the first liquid crystal in the first liquid crystal layer has a first twist angle, and the second liquid crystal in the second liquid crystal layer has a second twist angle, a range of one of the first twist angle and the second twist angle comprises 0°~34°, and a range of the other one of the first twist angle and the second twist angle comprises 89°~90°.

8. The display panel according to claim 7, wherein the thickness of the first liquid crystal cell along the direction perpendicular to the first polarization unit is larger than the thickness of the second liquid crystal cell along the direction perpendicular to the first polarization unit.

9. The display panel according to claim 8, wherein the first liquid crystal cell further comprises a first substrate and a second substrate, wherein the first substrate is disposed opposite to the second substrate, the first substrate comprises a first electrode, and the second substrate comprises a second electrode, and the first liquid crystal layer is disposed between the first electrode and the second electrode; the second liquid crystal cell further comprises a third substrate and a fourth substrate, wherein the third substrate is disposed opposite to the fourth substrate, the third substrate comprises a third electrode, and the fourth substrate comprises a fourth electrode, and the second liquid crystal layer is disposed between the third electrode and the fourth electrode; and
   the first electrode and the second electrode are configured to have a first voltage difference, and the third electrode and the fourth electrode are configured to have a second voltage difference, when any one of the first voltage difference and the second voltage difference is not zero, a total equivalent retardation amount of the first liquid crystal in the first liquid crystal layer and the second liquid crystal in the second liquid crystal layer is less than a total equivalent retardation amount of the first liquid crystal in the first liquid crystal layer and the second liquid crystal in the second liquid crystal layer when both the first voltage difference and the second voltage difference are zero.

10. The display panel according to claim 9, wherein under the condition that the first voltage difference is configured to be at a first fixed value, and the second voltage difference is configured to change within a first preset range, the range of the equivalent retardation amount of the first liquid crystal in the first liquid crystal layer comprises 200 nm~400 nm; and the range of the equivalent retardation amount of the second liquid crystal in the second liquid crystal layer comprises 130 nm~154 nm.

11. The display panel according to claim 10, wherein a range of the first fixed value comprises 0V~6V; and the first preset range comprises 0V~10V.

12. The display panel according to claim 9, wherein under the condition that the second voltage difference is configured to be at a second fixed value, and the first voltage difference is configured to change within a second preset rang, the range of the equivalent retardation amount of the first liquid crystal in the first liquid crystal layer comprises 240 nm~275 nm; the range of the equivalent retardation amount of the second liquid crystal in the second liquid crystal layer comprises 100 nm~200 nm.

13. The display panel according to claim 12, wherein a range of the second fixed value range comprises 0V~10V; and the second preset range comprises 0 v~10V.

14. The display panel according to claim 3, wherein the display panel comprises a third liquid crystal cell disposed between the first polarization unit and the reflection unit; and
   the display panel further comprises a second polarization unit, wherein the second polarization unit is disposed at a side of the reflection unit close to the third liquid crystal cell, or the second polarization unit is disposed at a side of the reflection unit far away from the third liquid crystal cell;
   the third liquid crystal cell comprises a third liquid crystal layer, and a range of an equivalent retardation amount of a third liquid crystal in the third liquid crystal layer comprises 321 nm~441 nm.

15. The display panel according to claim 14, wherein the third liquid crystal cell further comprises a fifth substrate and a sixth substrate, the fifth substrate and the sixth substrate are disposed opposite to each other, the fifth substrate comprises a fifth electrode, and the sixth substrate comprises a sixth electrode, and the third liquid crystal layer is arranged between the fifth electrode and the sixth electrode; and
   the fifth electrode and the sixth electrode are configured to have a third voltage difference, and a range of the third voltage difference comprises 0V~6V.

16. The display panel according to claim 14, wherein a transmission axis of the second polarization unit is not parallel to the transmission axis of the first polarization unit.

17. The display panel according to claim 16, wherein the transmission axis of the second polarization unit is perpendicular to the transmission axis of the first polarization unit.

18. The display panel according to claim 14, wherein the display panel further comprises an absorption unit configured to absorb light parallel to the transmission axis of the second polarization unit; and
   under the condition that the second polarization unit is disposed at a side of the reflection unit close to the third liquid crystal cell, the absorption unit is disposed at a side of the reflection unit far away from the second polarization unit; under the condition that the second polarization unit is disposed at a side of the reflection unit far away from the third liquid crystal cell, the absorption unit is disposed at a side of the second polarization unit far away from the reflection unit.

19. The display panel according to claim 18, wherein the absorption unit comprises black ink or a third polarization unit, and a transmission axis of the third polarization unit is perpendicular to the transmission axis of the second polarization unit.

\* \* \* \* \*